United States Patent
Von Borstel et al.

(10) Patent No.: US 6,539,045 B1
(45) Date of Patent: Mar. 25, 2003

(54) LASER WITH DEVICE FOR MODIFYING THE DISTRIBUTION OF LASER LIGHT INTENSITY ACROSS THE LASER BEAM CROSS-SECTION

(75) Inventors: Michael Von Borstel, Pleidelsheim (DE); Frank Ackermann, Stuttgart (DE); Mark Geschwandner, Gerlingen (DE)

(73) Assignee: Trumpf Lasertechnik GmbH, Ditzingen (DE)

( * ) Notice: Subject to any disclaimer, the term of this patent is extended or adjusted under 35 U.S.C. 154(b) by 0 days.

(21) Appl. No.: 09/647,850

(22) PCT Filed: Feb. 2, 2000

(86) PCT No.: PCT/EP00/00832

§ 371 (c)(1),
(2), (4) Date: Dec. 7, 2000

(87) PCT Pub. No.: WO00/46891

PCT Pub. Date: Aug. 10, 2000

(30) Foreign Application Priority Data

Feb. 3, 1999 (DE) .......................... 199 04 205
Feb. 3, 1999 (DE) .......................... 199 04 356
Feb. 3, 1999 (DE) .......................... 199 04 204

(51) Int. Cl.[7] ................ H01S 3/097; H01S 3/22; H01S 3/223; H01S 3/13

(52) U.S. Cl. ............... 372/81; 372/87; 372/55; 372/31

(58) Field of Search ............. 372/31, 19, 46, 372/58, 87, 55

(56) References Cited

U.S. PATENT DOCUMENTS

4,359,776 A * 11/1982 Acket et al. ............... 372/46
4,618,961 A    10/1986 Sutter, Jr.
4,757,511 A * 7/1988 Klingel et al. ............. 372/58

FOREIGN PATENT DOCUMENTS

| DE | 3931082 A1 | 3/1991 |
| JP | 61280689 | 12/1986 |
| JP | 02023684 | 1/1990 |
| JP | 02 281670 A | 11/1990 |
| JP | WO 9624181 | 8/1996 |

* cited by examiner

Primary Examiner—Quyen Leung
(74) Attorney, Agent, or Firm—Pepe & Hazard LLP

(57) ABSTRACT

A gas laser includes a control to modify the distribution of the intensity of the laser light over the laser beam cross section produced in the lasing gas within at least one laser tube by at least two electrodes and a voltage supply unit by means of which a voltage can be fed to electrodes. A discharge area forms in the lasing gas and this can be affected by adjusting the amplification profile of the laser over the excitation cross section of the laser tube.

36 Claims, 18 Drawing Sheets

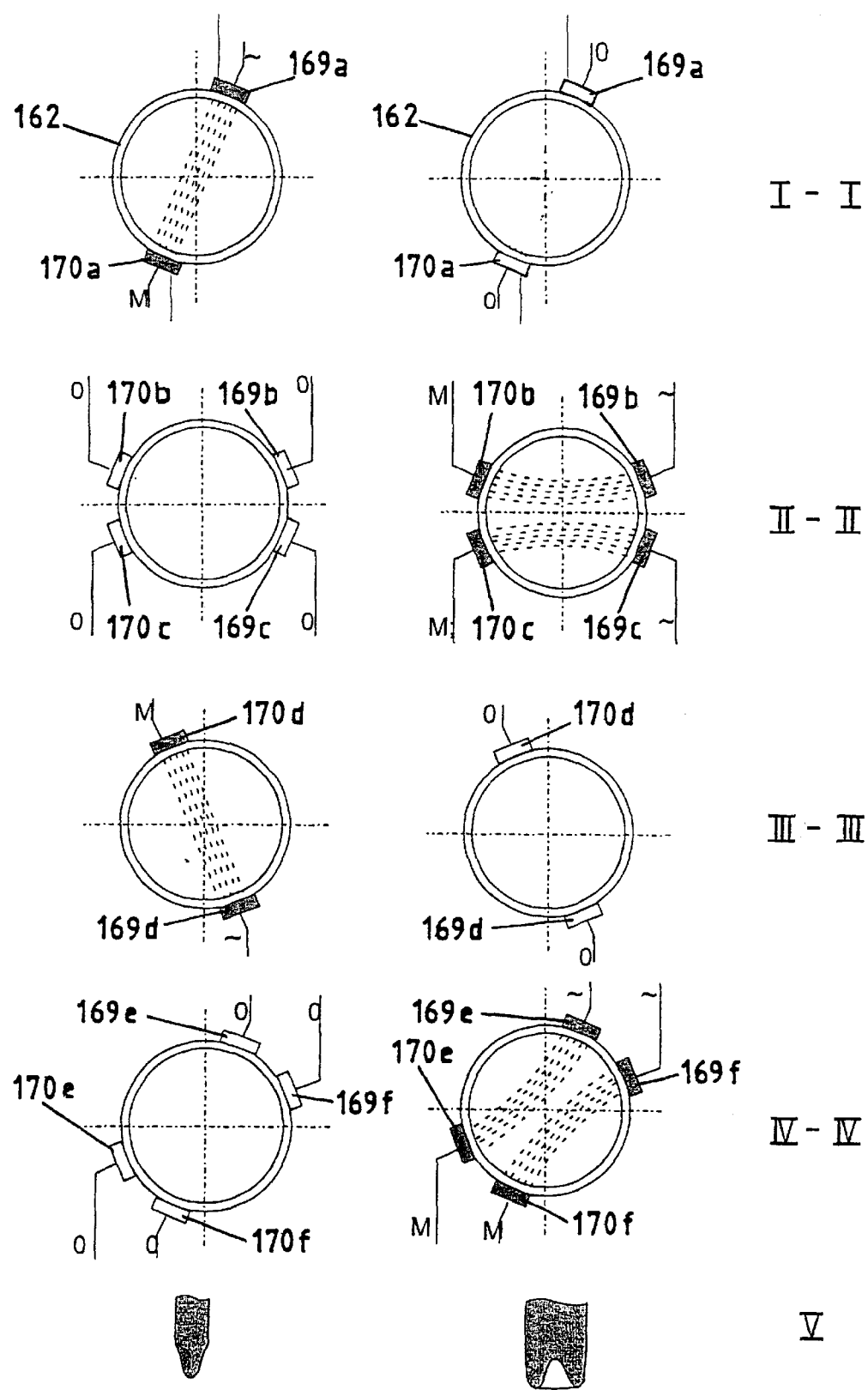

LASER WITH DEVICE FOR MODIFYING THE DISTRIBUTION OF LASER LIGHT INTENSITY ACROSS THE LASER BEAM CROSS-SECTION

BACKGROUND OF THE INVENTION

The invention relates to a laser with a housing such as at least one laser tube for a laser gas or a mixture of laser gases, with an electrode arrangement that comprises at least two electrodes, with a voltage supply unit by means of which a voltage can be fed to electrodes of the electrode arrangement in such a way that a discharge area forms in the laser gas or laser gas mixture, in which the laser gas or laser gas mixture is excited, and with a system for modifying the distribution of the intensity of the laser light over the laser beam cross-section (mode).

Lasers with a housing, an electrode arrangement and a voltage supply unit of the type described above are described in U.S. Pat. No. 4,757,511, for example. From this publication—which is moreover expressly referred to for explaining all details not described more thoroughly here— lasers are known in which the laser gas is a mixture of a laser-active gases—particularly CO or $CO_2$—and a few other components, e.g. $N_2$ and helium. Such lasers are used, among other things, for the processing—i.e., cutting or welding—of workpieces. In this connection, the voltage fed to the electrodes of the electrode arrangement can be a direct or alternating voltage. A high-frequency alternating voltage (HF voltage) is preferred. In the process, the electrodes of the electrode arrangement can be arranged on or in the housing.

In the case of the types of lasers described in U.S. Pat. No. 4,757,511, individual electrode pairs are twisted against each other in order to obtain—"integrated" over the length of the laser—as uniform a discharge as possible.

When processing workpieces, factors that play a role are, principally the output of the laser and the beam diameter, which depend on the geometry of the laser tube and the electrode arrangement and on the respective output, and the distribution of the intensity of the laser light over the cross-section of the unfocussed laser beam (also referred to as "mode"). The width of a cutting clearance, or kerf or of a welding seam, is determined by the beam diameter and the aforementioned intensity distribution. The thickness of material able to be cut as well as the attainable cutting speed are likewise dependent upon the two aforementioned parameters. Furthermore, beam diameter and mode are decisive for the thermal load of the optic elements used for beam shaping and beam guidance.

A laser beam with a high intensity maximum in the middle, from which the intensity decreases all around (also referred to as "Gauss mode"), can very well be focused on a small spot, thus resulting in a very high energy density. High cutting speeds can thereby be achieved. In addition, very narrow cutting clearances are obtained, which is desirable when cutting thin metal sheets. On the other hand, however, with the Gaussian mode the optic elements used for beam formation and beam guidance are under considerable thermal load precisely at high outputs due to the intensity maximum.

When cutting thick metal sheets, more than a high laser output is necessary. In addition, a certain minimum width of the cutting gap or kerf is desirable for blowing out the slag. These requirements can be best fulfilled by a laser beam in which the intensity maximum of the unfocused beam is situated not in the middle but rather at the periphery (so-called "ring mode"). In the case of the ring mode, even at high laser outputs, the optic elements of the concerned laser are less burdened than with the Gaussian mode because the energy density is lower.

In welding, the required laser output is likewise quite high, while the demands on the laser beam's ability to focus are comparably slight because no cutting clearance needs to be produced. In welding, the work is also typically done with a laser beam that has no pronounced intensity maximum in the middle. On the other hand, with other processing a nearly rectangular intensity distribution (so-called "flat top mode") can be useful.

Under the circumstances described in the preceding discussion, it is particularly advantageous if the distribution of the intensity of the laser light over the cross-section of the unfocused laser beam, i.e. the mode, can be adapted to the processing method carried out in each case.

With most currently known lasers, the mode is determined by the unalterable geometry of the laser tube, the arrangement of the electrodes and the mirrors, by the feed of energy and the properties of the lasing gas. Practically speaking, this predetermined mode cannot be influenced by the laser user. Setting the distribution of the intensity of the laser light over the cross-section of the laser beam to adapt to the respective case of application is not easily possible.

For this reason, it was attempted in the past to achieve an adaptation of the laser mode to the respective processing case by replacing essential components or entire laser systems or machines (cutting lasers—welding lasers). This method of procedure requires not only high investment costs but also makes a quick retooling for different processing methods impossible.

A laser of the kind indicated hereinbefore, i.e. a laser with a system for modifying the distribution of the intensity of the laser light over the laser beam cross-section, is known from German Patent No. 44 01 597. However, this publication leaves unresolved the question of what technical measures are used to bring about the modification of the mode.

It is an object of the present invention is to provide a novel laser of the kind hereinbefore described which permits facile modification of the distribution of the intensity of the laser light over the laser beam cross-section, i.e., a modification of the mode, to adapt the intensity distribution or mode to the desired application with low structural/equipment expenditure.

Another object is to provide such an adjustable laser with relatively low additional cost and relatively little additional components.

SUMMARY OF THE INVENTION

It has now been found that this technical problem may be solved according to the present invention by incorporating in a gas laser a system for modifying the mode which comprises means for adjusting the amplification profile of the laser over the excitation cross-section of the housing for the laser gas or the laser gas mixture. The excitation cross-section in the aforementioned sense refers to a cross-section perpendicular to the laser beam propagation direction, in which the excitation of the laser gas or laser gas mixture takes place. There is a different amplification in each point of an excitation cross-section. The spatial distribution of these amplification points is referred to as the amplification profile which is in turn decisive for the mode being set. In that the present invention applies to mode modification on the amplification profile of a laser, it differs from "mode diaphragms" of the known kind, for example. Such mode diaphragms are aperture diaphragms used to bring about a damping of modes that were first set. As will be described in detail below, the mode can be set according to the invention by means of systems that are present on lasers anyway or that can be provided in such lasers without great expense.

In one embodiment the amplification profile of the laser may be adjusted over the excitation cross-section of the housing for the laser gas or the laser gas mixture by including a device by means of which the excitation potential fed by the electrodes into the laser gas or the laser gas mixture is able to be modified. By setting the supplied excitation potential at relatively high values, the light amplification in the area of the beam axis can be minimized. The result is then a ring mode. This is conveniently effected by varying the amplitude of the HF voltage fed to the electrodes or by modifying the keying into of the pulsing excitation.

Generally, the excitation potential fed into the laser gas is variable from 0 to KW and ever higher. In one embodiment, several predetermined or fixed values or ranges for the excitation potential can be incorporated in the laser controls. Preferably at least one fixed value or range is above 2 KW. By varying the excitation potential, the mode is continuously adjustable.

In another embodiment, numerous measures are provided alternatively or jointly; the objective of all of them is, by influencing physical properties of the laser gas or the laser gas mixture, to locally adjust the resulting light amplification to thereby design the amplification profile of the laser on the whole. These measures also make it possible, starting from a Gauss mode, to minimize the light amplification in the area of the beam axis and to thereby produce a ring mode. This can be achieved, for example, by setting the temperature of the laser gas or the laser gas mixture at relatively high values and/or by targeted modification of the partial pressures of the components of the laser gas or the laser gas mixture and/or by setting a relatively low flow rate of the laser gas or the laser gas mixture in the corresponding area.

When switching on the voltage at the electrodes, as a rule the discharge of the laser gas or the laser gas mixture does not "ignite" uniformly over the entire surface of the electrodes. Rather, a discharge channel first forms between two relatively small areas on the surfaces of the mutually associated electrodes. The electric potentials between the individual areas of the mutually assigned electrodes determine the shape and the position of the resulting "ignition discharge channel". The design of the electrodes thus essentially predetermines the shape and the position of the channel in which the discharge ignites.

The discharge starts in the area in which the field strength is greatest. Afterward, the discharge channel widens toward the sides (relative to the discharge channel), in such a way that between areas of mutually assigned electrodes a discharge also "fires" for which the energy conditions are less favorable than for the "start area", that is, for the area in which the discharge first ignited.

In this connection, the rate at which the ignition discharge channel spreads out over the entire cross-section—cross-section possible based on the electrode design—of the housing for the laser gas or the laser gas mixture, particularly over the possible cross-section of the laser tube, depends essentially on the geometry of the electrodes and the properties of the laser gas.

If the laser is operated in key operation, i.e. with pulsing excitation, the voltage required for the discharge of the laser gas or the laser gas mixture is not constantly connected at the concerned electrodes of the electrode arrangement. Rather, the electrode voltage is switched on and off. The frequency of the ON/OFF change is then referred to as the "keying frequency". "Keying frequency" is understood to mean the relation of two consecutive switched-on periods on the one hand and the switched-off period for the electrode voltage between these switched-on periods. On a keyed laser the switched-on period determines the shape and position of the discharge forming in each cross-section between the respective electrodes (time-dependent). The shape/the position of the discharge channel between the concerned electrodes in turn defines the density distribution of the laser-active particles of the laser gas or the laser gas mixture in the respective cross-section of the housing for the laser gas or the laser gas mixture or the amplification profile of the laser.

According to the invention, the shape of the electrode surfaces facing each other is therefore designed in such a way that, by selecting different keying frequencies or types of keying operation, different shapes of discharge areas in the cross-section of the housing for the laser gas or the laser gas mixture and thereby different modes can be set in targeted manner.

If, for example, a laser has one or more laser tubes with electrodes at which the discharge starts in the electrode peripheral areas, at high keying frequencies this results in a peripherally accentuated amplification profile, because almost no discharge takes place in the middle of the laser tube. If several pairs of electrodes twisted against each other are arranged along the laser tube or laser tubes, the peripherally accentuated amplification profiles add up in such a way that the laser operates in a (nearly rotationally symmetrical) ring mode. If the keying frequency is then reduced, a noteworthy discharge also takes place in the center of the laser tube. With an appropriately selected keying frequency, a Gauss mode or a "flat-top mode" then sets in.

Accordingly, in a laser the electrodes of which are such that the discharge begins from the middle of the electrodes, at high keying frequencies the result is a mode accentuated in the middle. If several pairs of electrodes twisted against each other are arranged consecutively along the laser tube or laser tubes, a Gauss mode sets in, i.e., a (nearly) rotationally symmetrical intensity distribution with a maximum on the optic axis of the laser and a steep drop toward the periphery. By reducing the keying frequency or by changing the keying ratio in the sense of a prolongation of the period during which a voltage is supplied at the electrodes of the electrode arrangement, the discharge area in the cross-section of the housing for the laser gas or the laser gas mixture is enlarged. The mid-section accentuation of the intensity of the laser light over the laser beam cross-section weakens compared to previously prevailing conditions.

When using electrodes whose surfaces facing the laser gas or the laser gas mixture have several differently designed areas, by modifying the keying ratio, that is, the relation of the switched-on and switched-off periods of the concerned electrodes of the electrode arrangement, it is possible to switch between Gauss mode and ring mode and, should the occasion arise, other modes such as the "flat-top mode. It should be expressly clarified at this point that by implementing the basic theory according to the invention, it is not only possible to switch the mode of a laser to the aforementioned two or three types of modes but it is also possible to produce other modes adapted to the respective processing case, e.g. modes with an asymmetric intensity distribution. This is possible, for example, by combining differently shaped electrodes and different rotational angles of individual electrode pairs along the laser.

In addition, the twisting of individual electrode pairs against each other can be changed between consecutive processing steps.

In this connection, the keying frequency can range from 0 Hz (no keying, i.e. continuous wave or cw operation ) to more than 100 kHz (the frequency indication relates to the number of keyings, i.e., the number of switch-on steps per second).

It is furthermore advantageous if the keying ratio (pulse length or switched-on period per keying/pause length, i.e., switched-off period between two consecutive keyings) is variable. What is decisive is the period during which the voltage is connected. A measure for this is the keying frequency as well as the keying ratio.

In a further preferred design of the invention, it is provided for that on a control unit for the laser, several fixed keying frequencies can be set each of which brings about a specific intensity distribution or a specific mode. Of course, it is also possible to provide for a continuous adjustability of the keying frequency and/or the keying ratio.

With typical gas lasers, such as $CO_2$ or CO lasers for processing work pieces, at least one keying frequency is preferably greater than 10 kHz. In this connection, the keying frequency may be greater than 50 kHz, particularly greater than 80 kHz.

In one embodiment, switching elements each connect one or more electrodes of the electrode arrangement to the voltage supply unit. Depending on which of the various electrodes of the electrode arrangement are connected to the voltage supply unit, different discharge areas or channels ensue in the laser gas or the laser gas mixture over the cross-section of the housing for the laser gas or the laser gas mixture.

The shape and/or the position of the discharge area between two or more activated electrodes, i.e. electrodes connected with the voltage supply unit, determines the amplification profile of the laser and thus the intensity distribution of the laser light over the laser beam cross-section.

If the laser is then provided with numerous electrodes assigned or assignable to each other and able to be arbitrarily activated, by selecting the activated electrodes, i.e., by selecting the electrodes between which a discharge path builds up, the amplification profile can be set differently without needing to modify the geometry of the housing for the laser gas or the laser gas mixture and/or the optic components and/or the electrodes of the electrode arrangement of the laser or to replace parts.

To form a specific amplification profile and thus a specific mode, a control unit appropriately controls the switching elements.

In this connection, the electrodes—at least a portion of which can be arbitrarily activated—can be arranged at a distance from each other in the same cross-section of the housing for the laser gas or the laser gas mixture or in the direction of the laser beam or the housing's longitudinal axis. The latter solution has the particular advantage that the individual excitation profiles then do not overlap and thereby disturb each other, and that by "adding up" the amplification profiles present in the individual cross-sections along the housing, almost any desired intensity distributions can be achieved, but particularly the frequently required rotationally symmetrical distributions such as Gauss or ring mode.

Elements that have an amplification or weakening function can be used as switching elements. Simple on/off switches that connect the voltage at specific electrodes or switch specific electrodes off are particularly preferred as switching elements.

If the impedance changes when switching between various electrodes, an impedance compensation is preferably provided so that comparable conditions always ensue.

As already explained, in addition to the choice of keying frequency and keying ratio, the design of the electrode surfaces facing the laser gas, for example, is also essential for the invention.

Electrodes of the widest variety of arrangements or designs can be used on lasers according to the invention. Thus, the electrodes of the electrode arrangement may be arranged shifted in the direction of the periphery of the laser beam, they may have a different bend and/or a different azimuthal span. Due to the overlapping—connected with the shifting of the electrodes—of the discharge channels between the individual electrodes, practically any desired mode can then be generated. In this connection, the individual electrodes may also be at a distance from each other in azimuthal direction.

By means of the azimuthal span of the electrode surfaces, for an ignition in the middle the discharge channel width ensuing at low keying frequencies is determined, or when igniting from the periphery, the diameter of the ring is determined in the case of a ring mode.

Within the framework of the invention, electrode surfaces are conceivable that essentially follow the course of the surface of the housing for the laser gas and laser gas mixture, that is, the wall of a round or polygonal laser tube, for example.

In addition, the electrode surfaces can have in the central area at least one raised area, such as a peak or edge, or at least one recess, such as a groove, for example. In the case of a rise in the central area, the discharge starts from the raised area after switching on the voltage, while in the case of a recess, the discharge ignites from the areas surrounding it.

In this connection, the raised areas can be formed by projections, peaks or a ridge design of the respective electrode surface. Useful width or depth relations on electrodes provided with a recess are described hereinafter.

Generally speaking, the electrodes do not all have to be designed identically. For example, they may have differently designed surfaces on their sides facing the laser gas or the laser gas mixture. It is advantageous, however, if the design of the surfaces facing the laser gas is identical for electrodes assigned to each other in pairs, because at ignition, a defined discharge path with of two-fold symmetry then ensues which—as will be explained below—simplifies the setting of a rotationally symmetrical intensity distribution.

In addition, the electrodes of the electrode arrangement can be at least partially at a distance from the axis of the laser beam.

Furthermore, it is possible for the surfaces facing the laser gas of at least individual electrodes to consist of several parts designed differently. By means of the control unit, the individual parts can then be connected separately. In this regard, the distance of the individual parts from the axis of the laser beam and/or the azimuthal span of the individual parts can be different. In particular, it is possible for the electrodes to have raised areas or drops such as recesses or grooves, etc. The discharge is then of different "intensity"

depending on the distance between the electrode partial surfaces assigned to each other.

In principle, the invention can be implemented in the case of all voltage-excited lasers. A particularly preferred case, however, is the one in which the voltage supply unit feeds an alternating voltage to the electrodes and the frequency of this alternating voltage is greater than 100 kHz and, in particular, between 1 MHz and 10 MHz (high-frequency excited laser). One should distinguish between the frequency of the voltage fed to the electrodes and the aforementioned keying frequency, i.e., the frequency with which the concerned electrodes of the electrode arrangement are connected to the voltage or separated from it.

BRIEF DESCRIPTION OF THE DRAWINGS

The invention is explained below in more detail using schematic diagrams of forms of construction. The drawings are expressly referred to regarding the disclosure of all details not explained more thoroughly in the text. The following are shown:

BRIEF DESCRIPTION OF THE DRAWINGS

Figure 1:
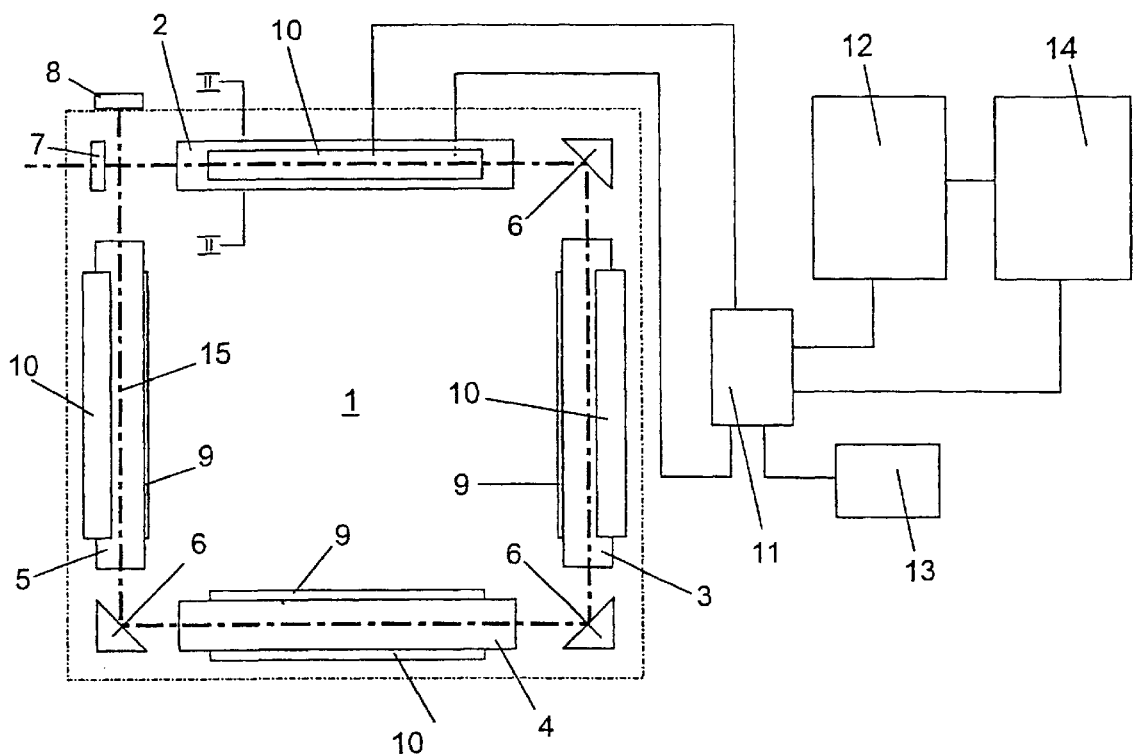
Figure 2:
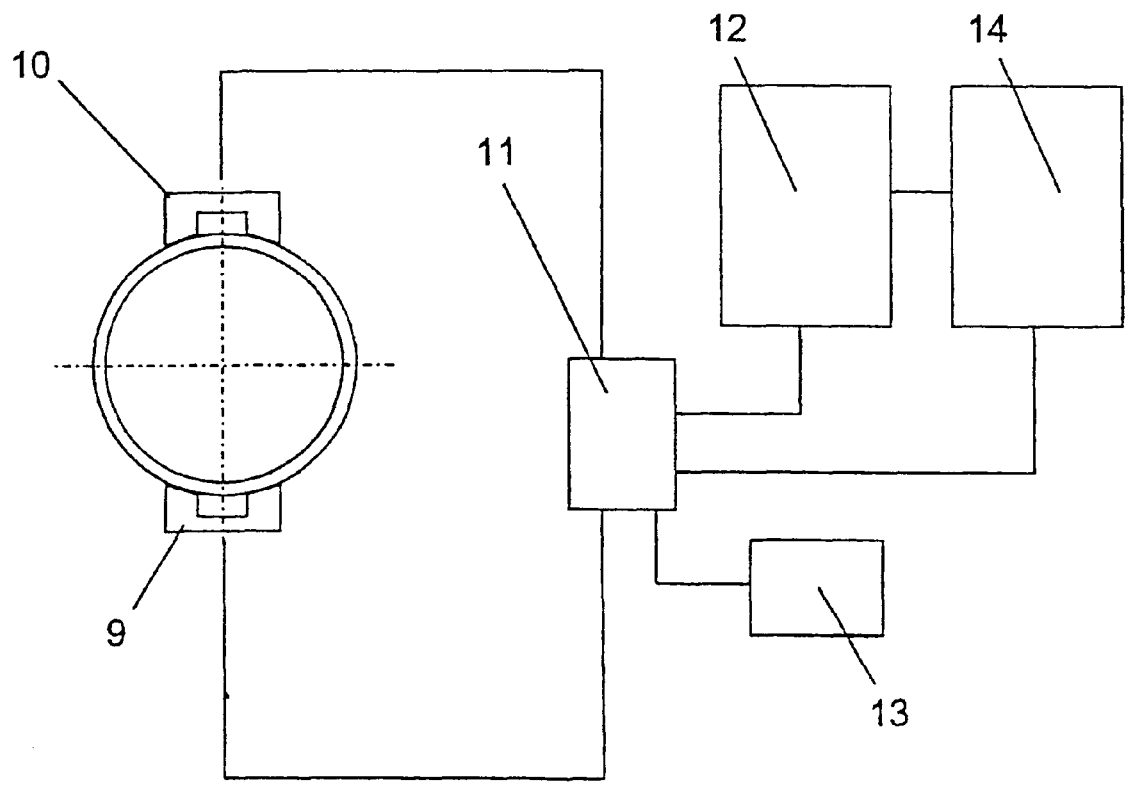
Figure 3:
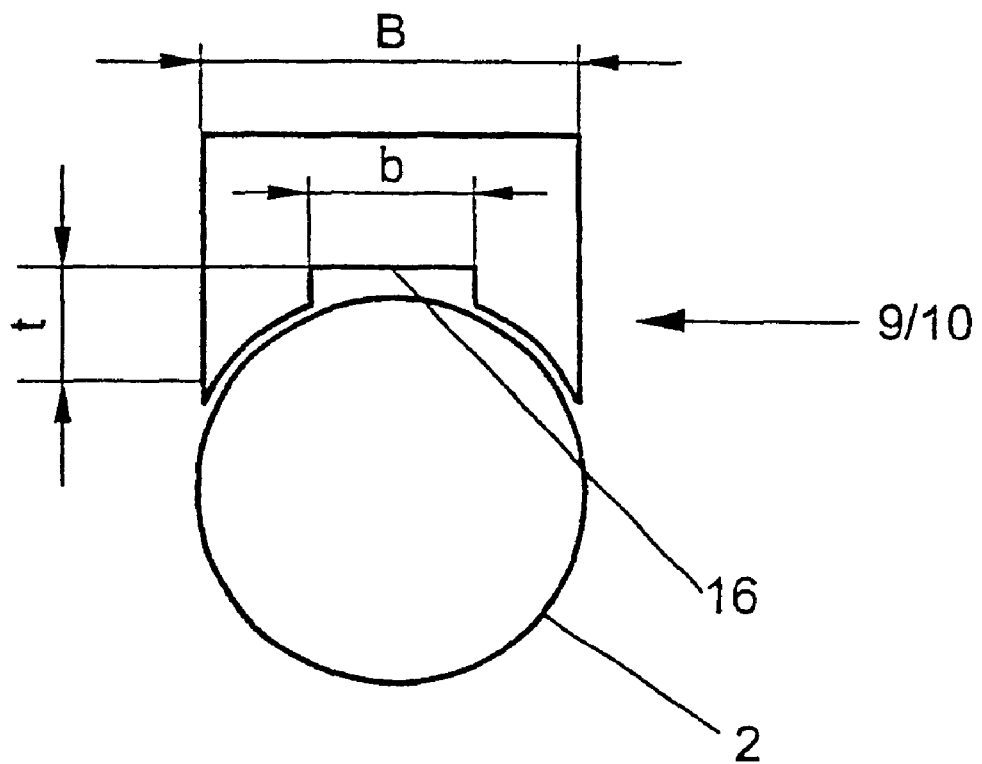
Figure 4:
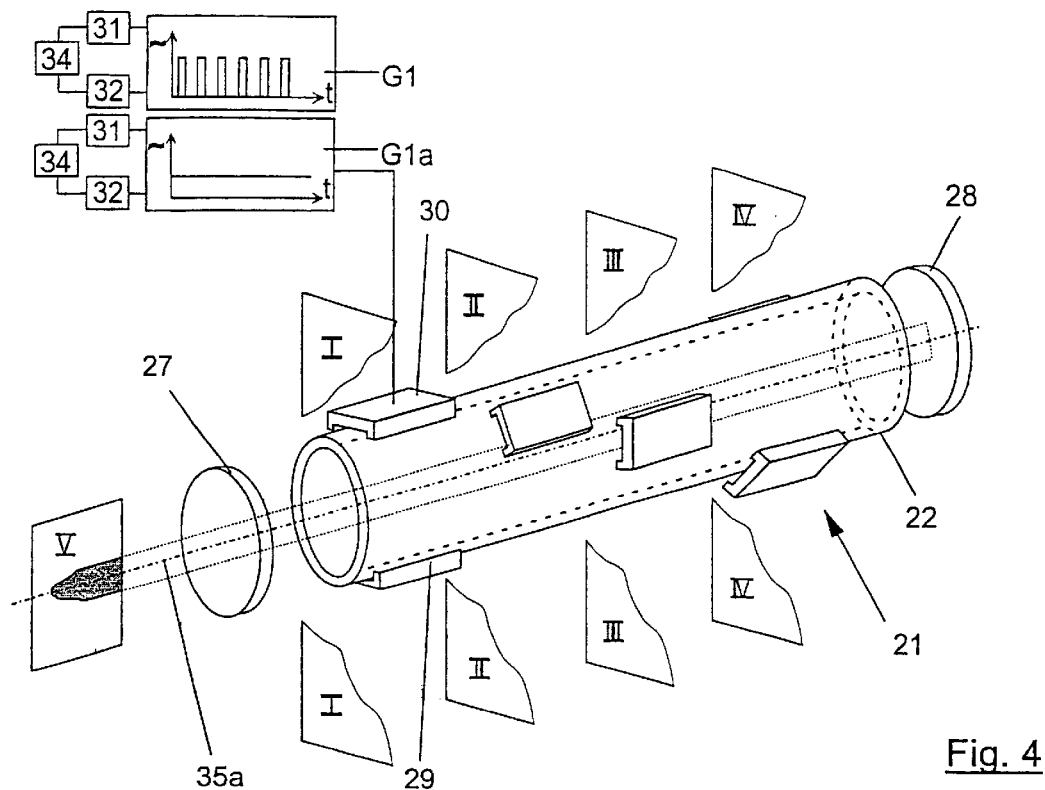
Figure 5:
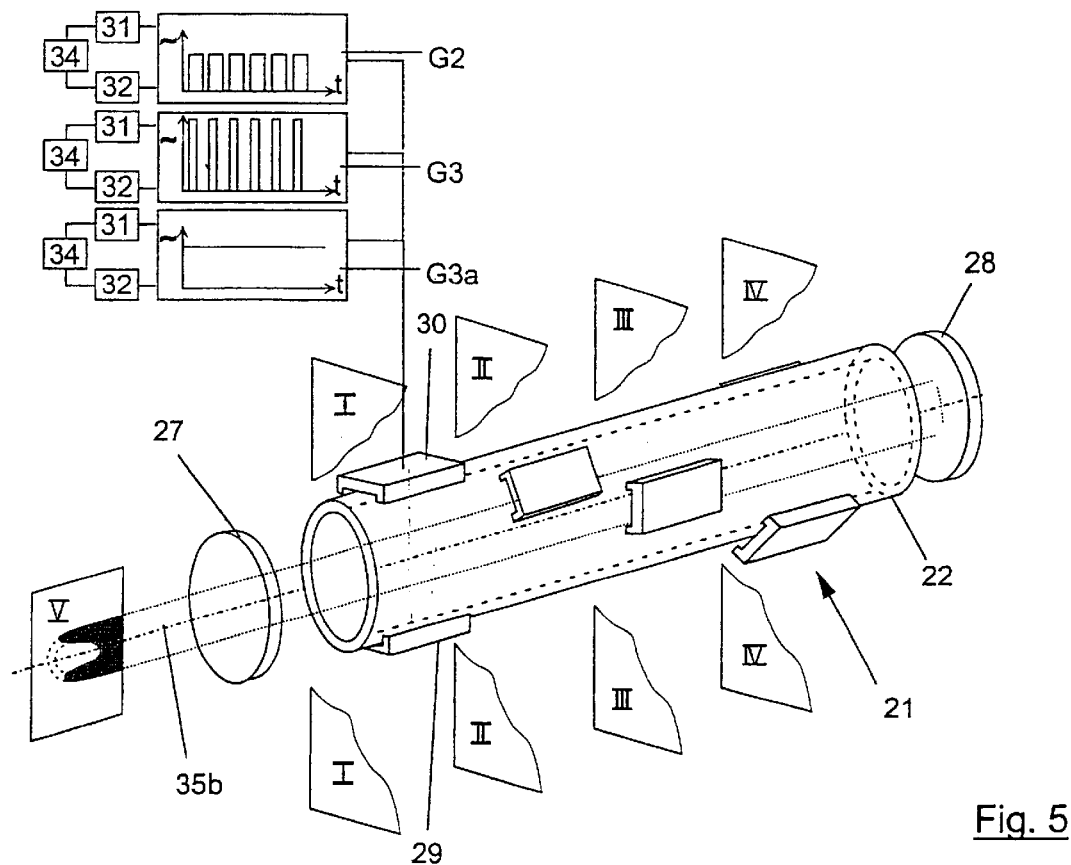
Figures 6, 7:
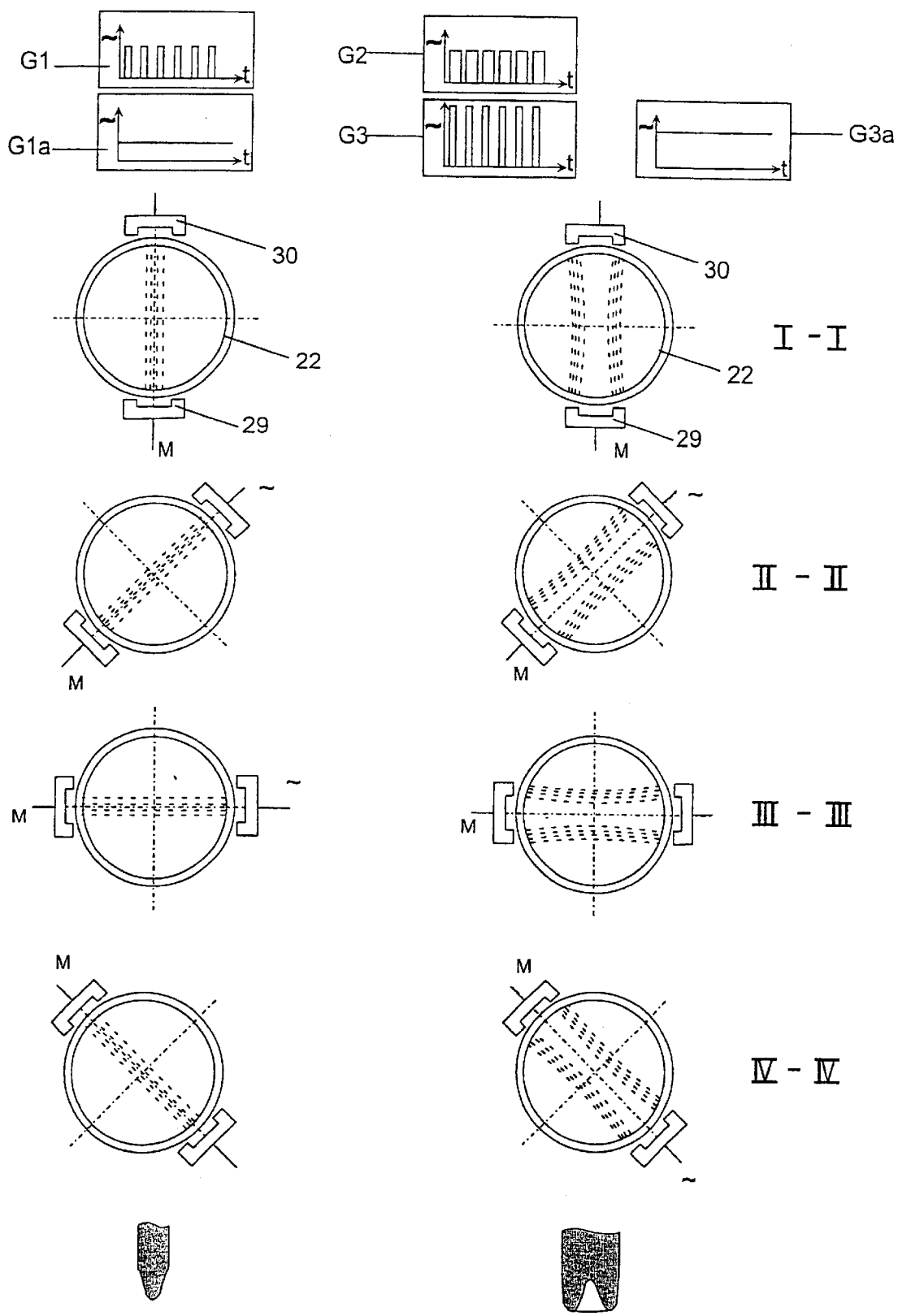
Figure 8:
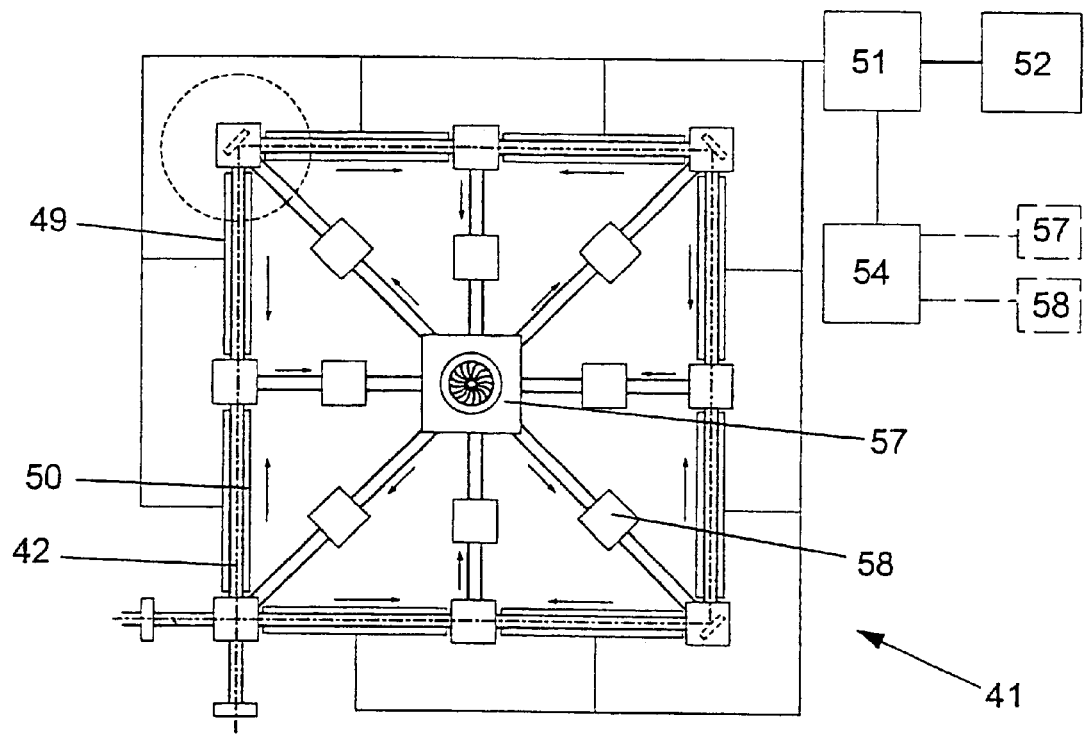
Figure 9:
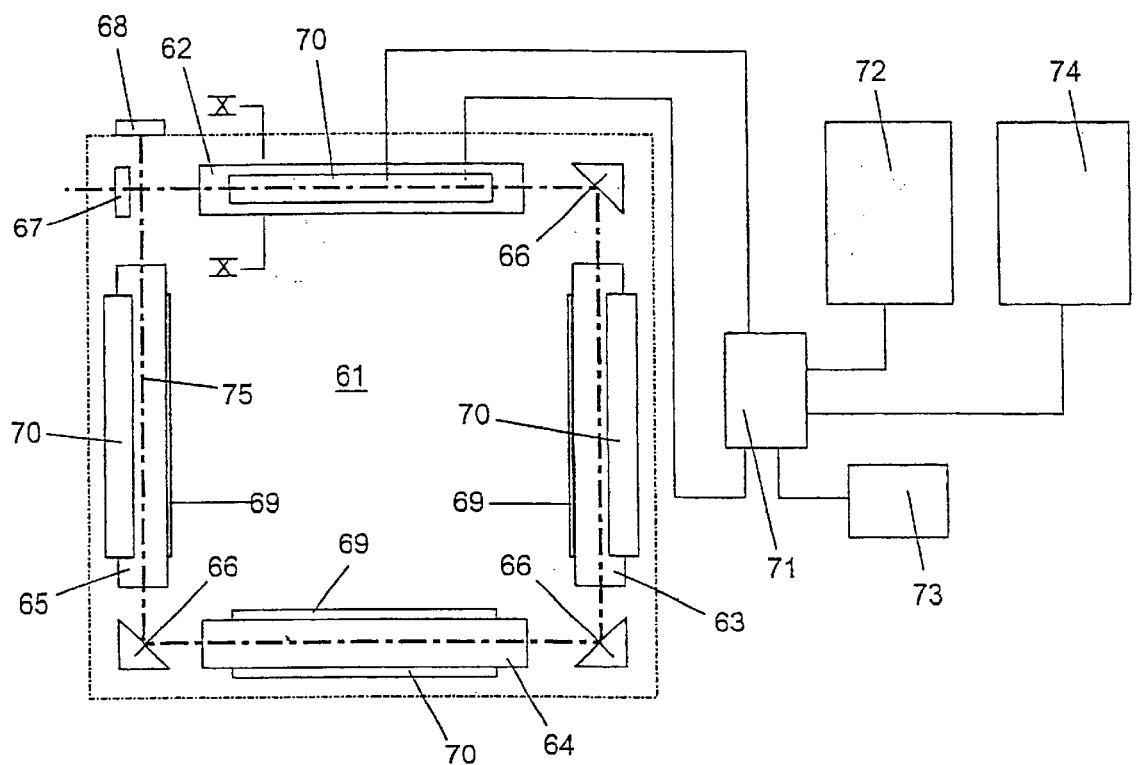
Figure 10:
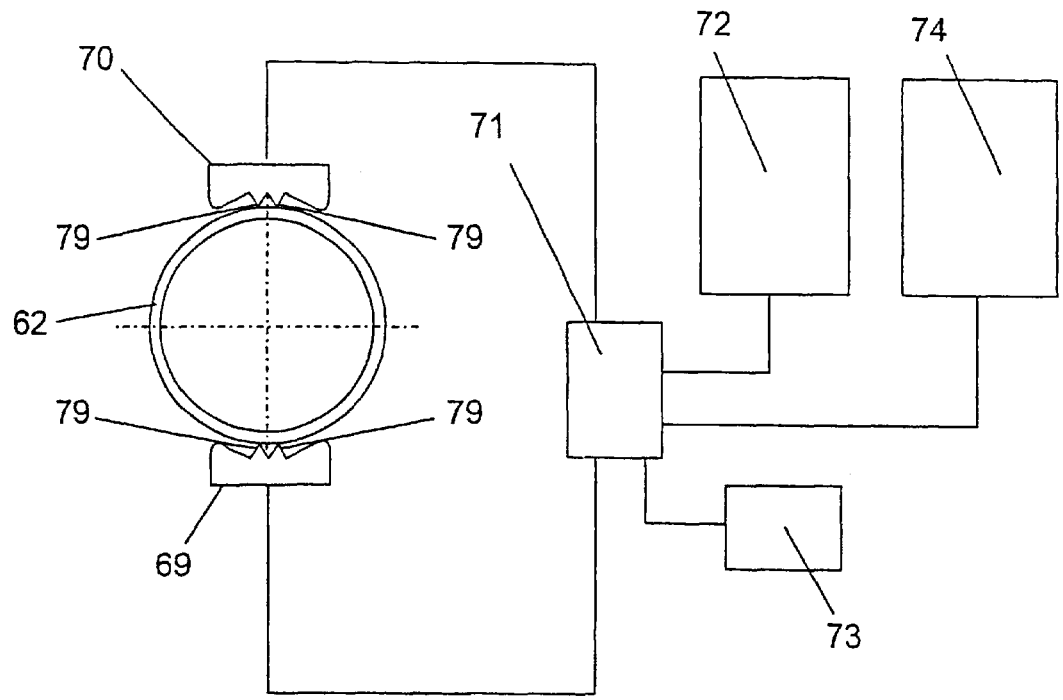
Figure 11:
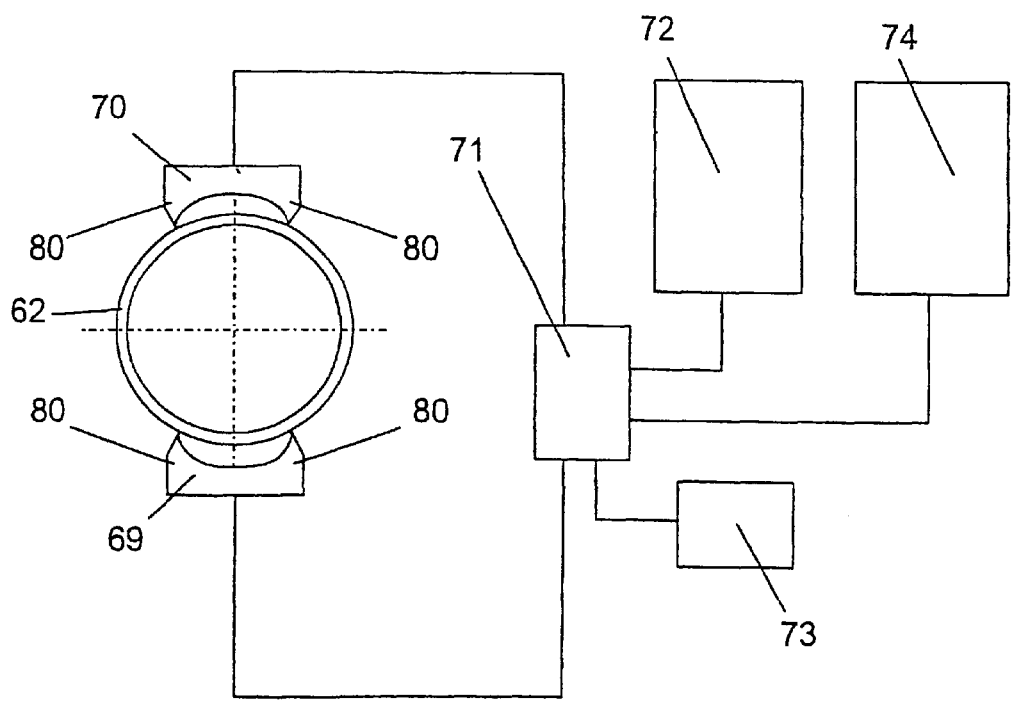
Figure 12:
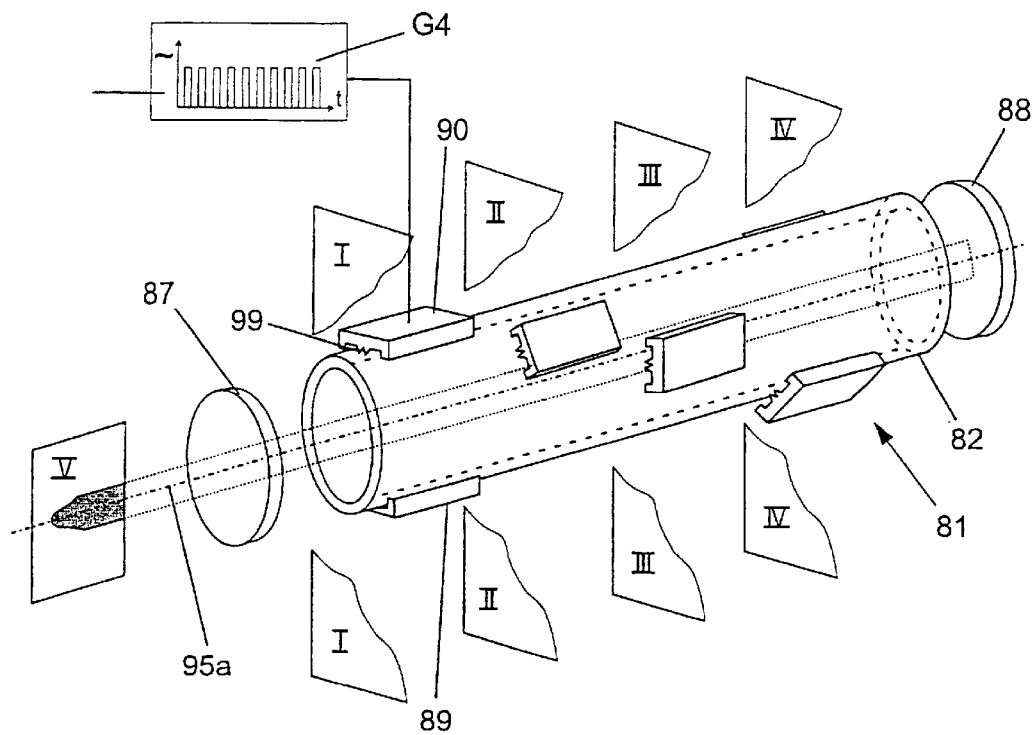
Figure 13:
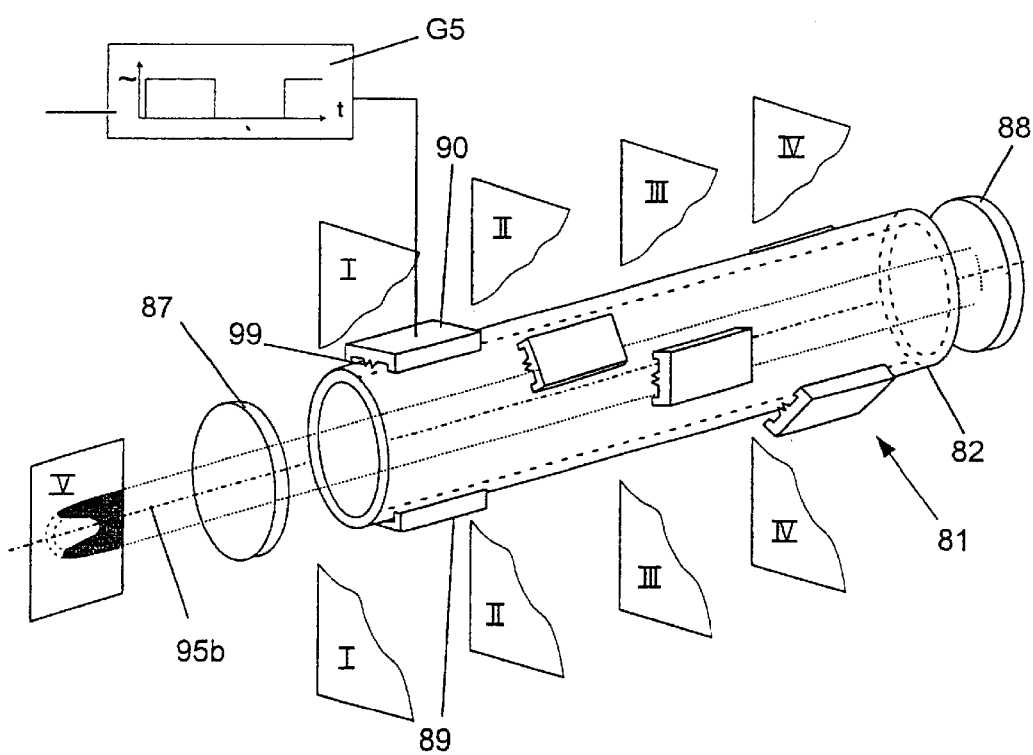
Figures 14, 15:
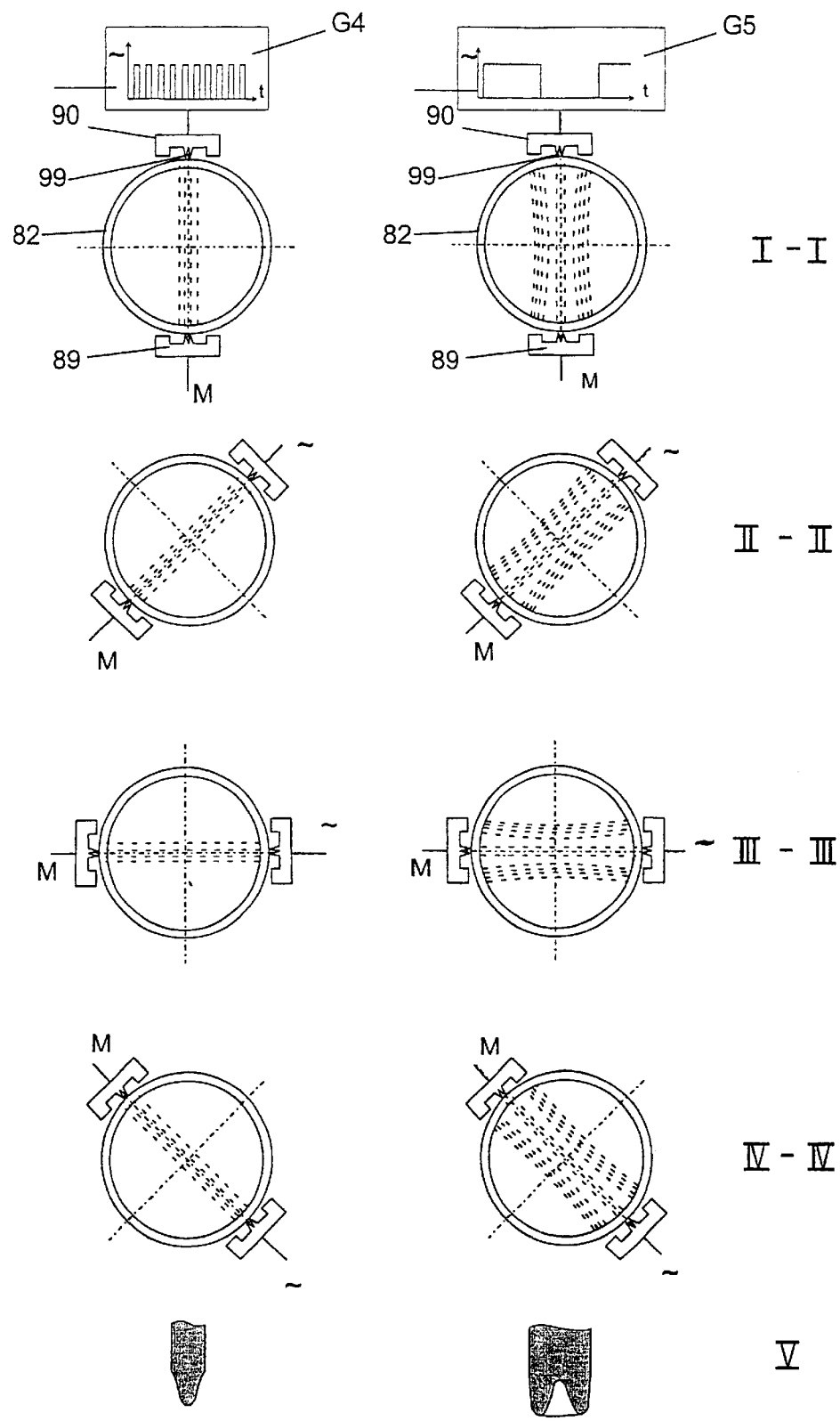
Figure 16:
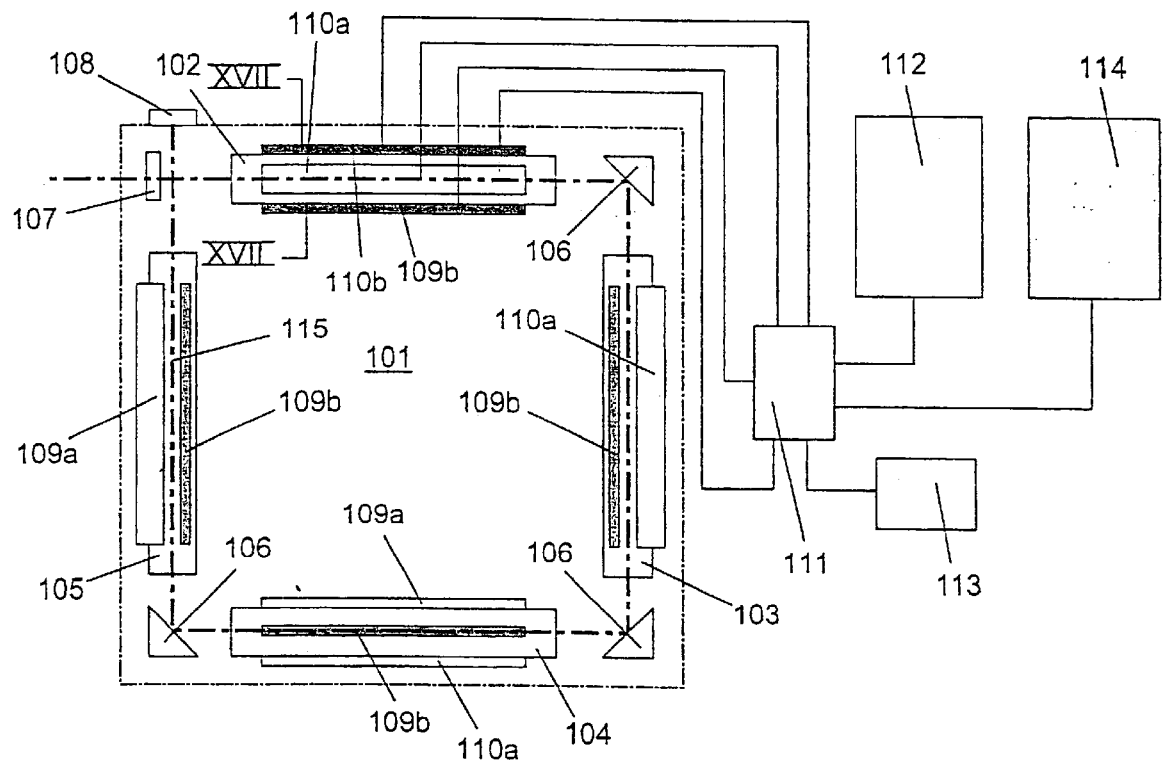
Figure 17:
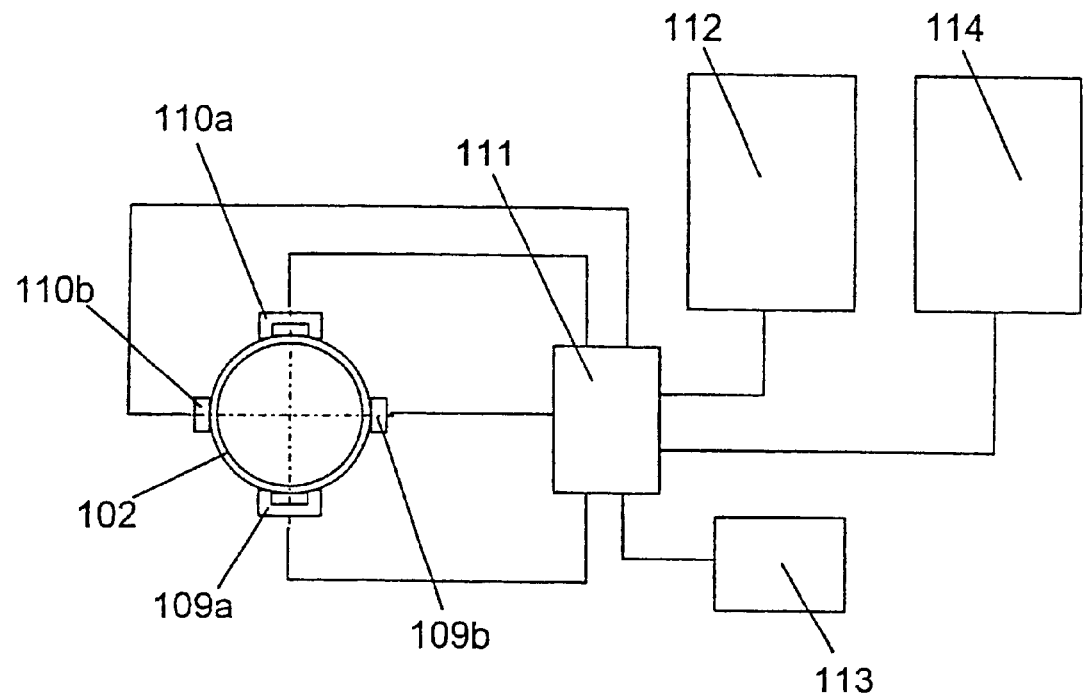
Figure 18:
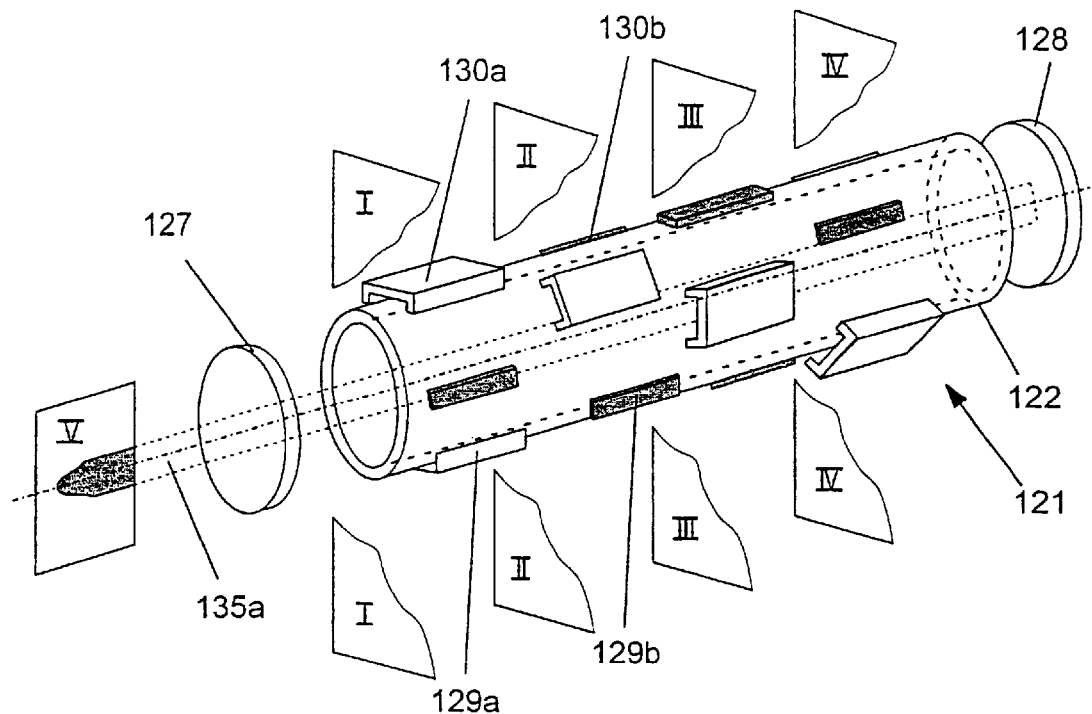
Figure 19:
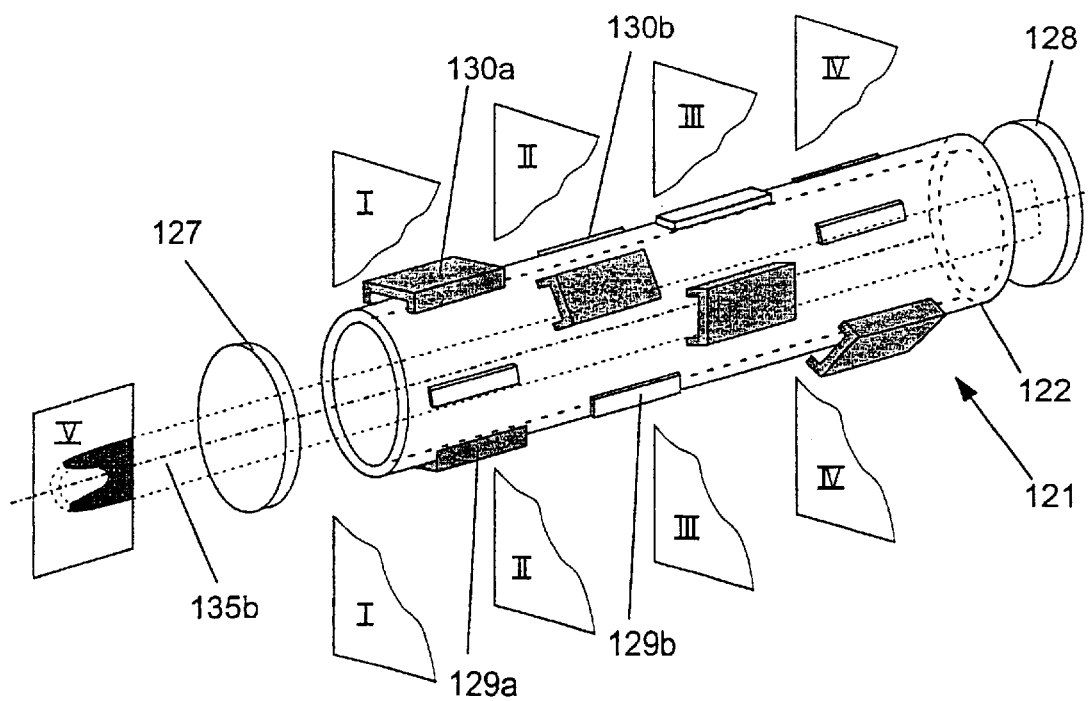
Figures 20, 21:
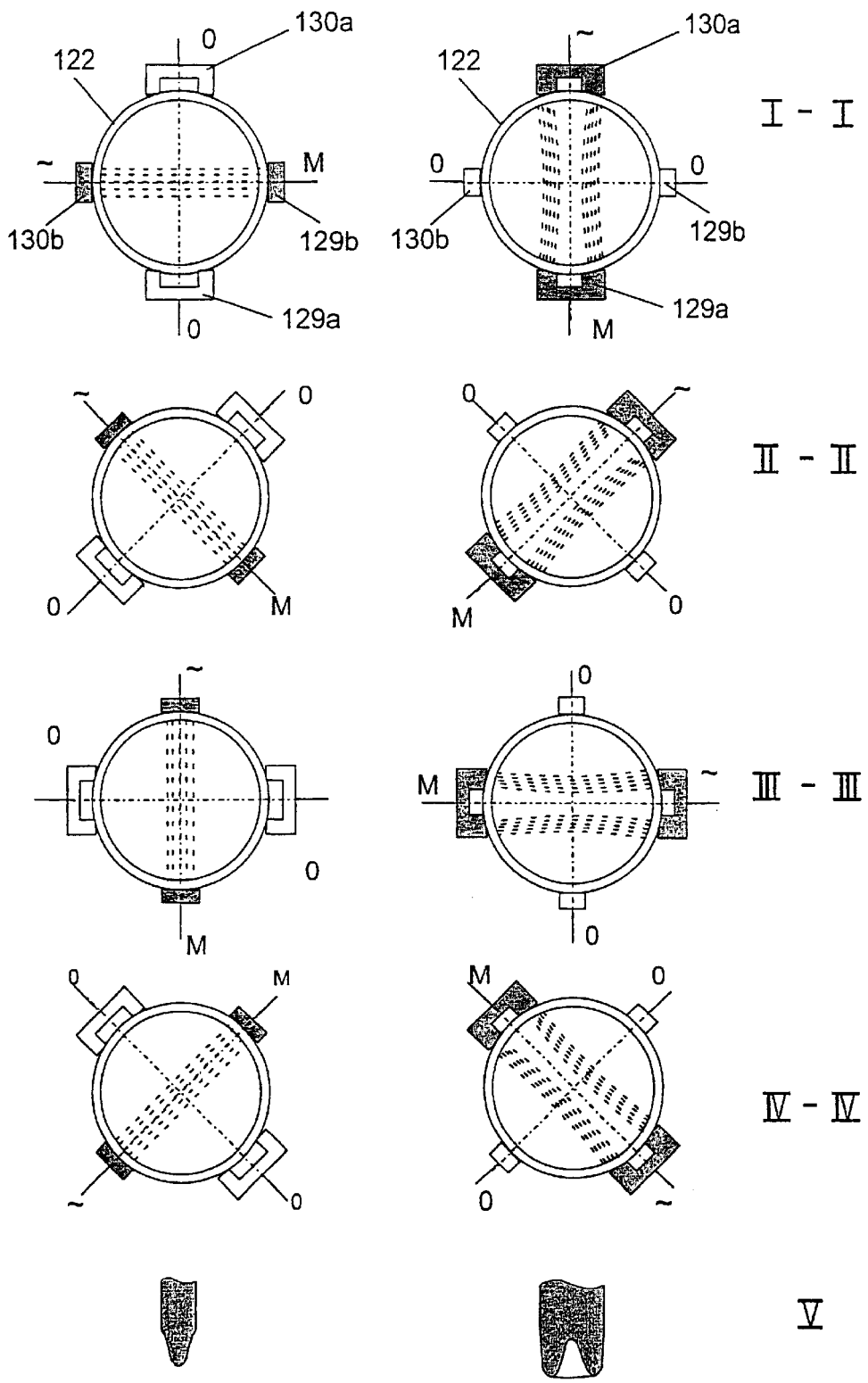
Figure 22:
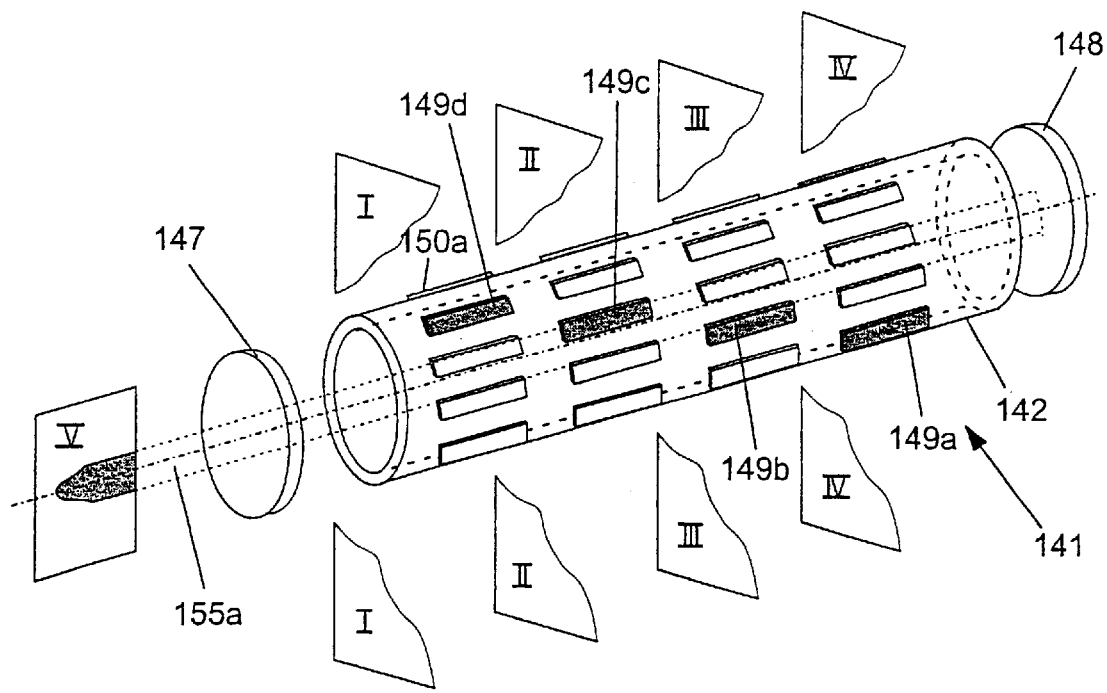
Figure 23:
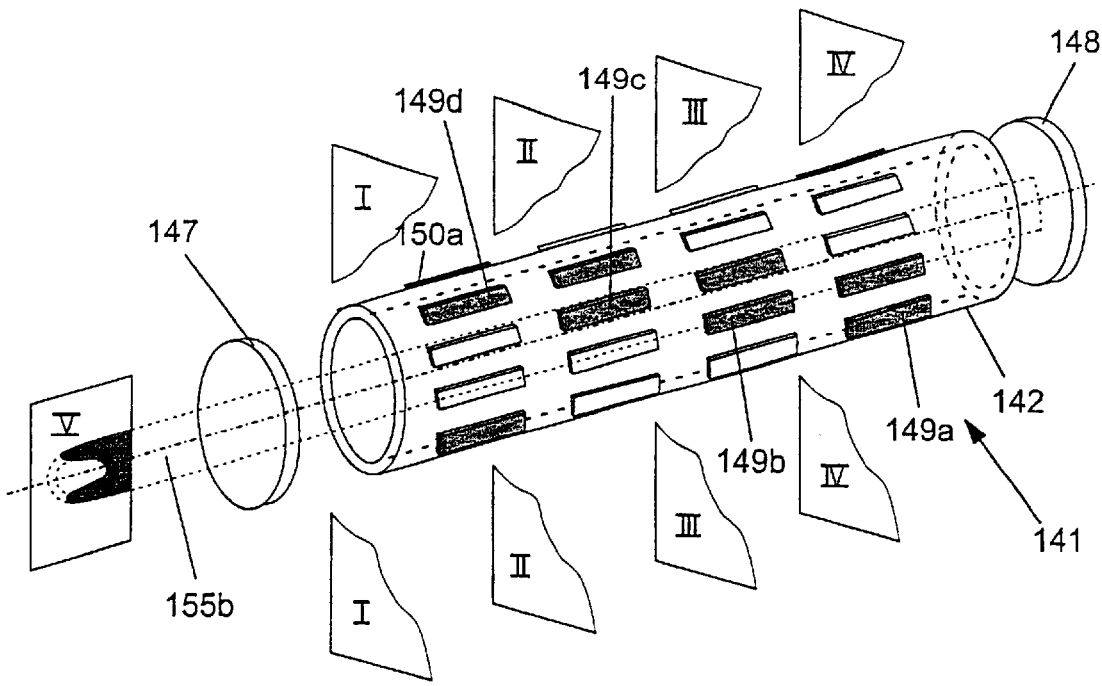
Figures 24, 25:
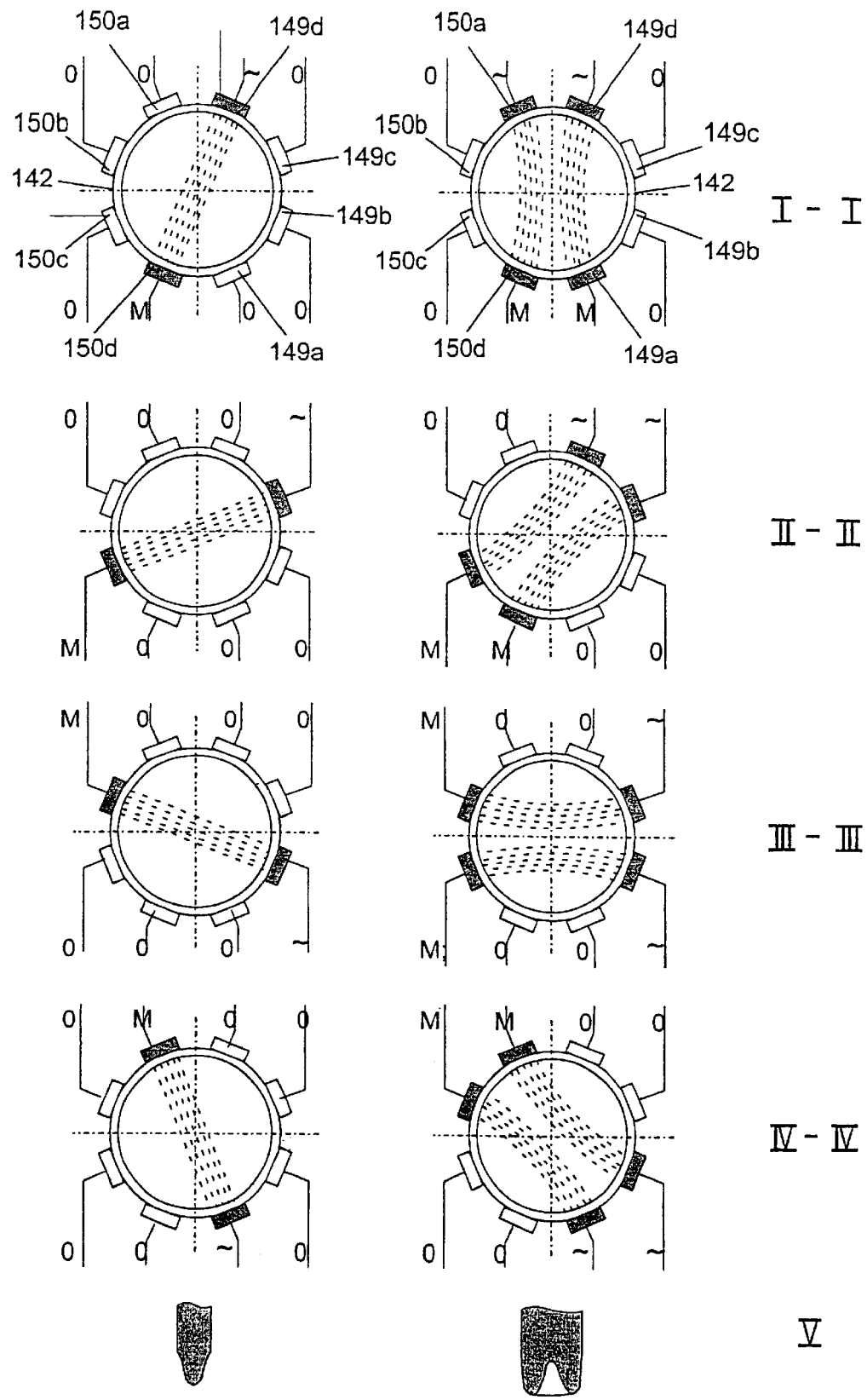
Figure 26:
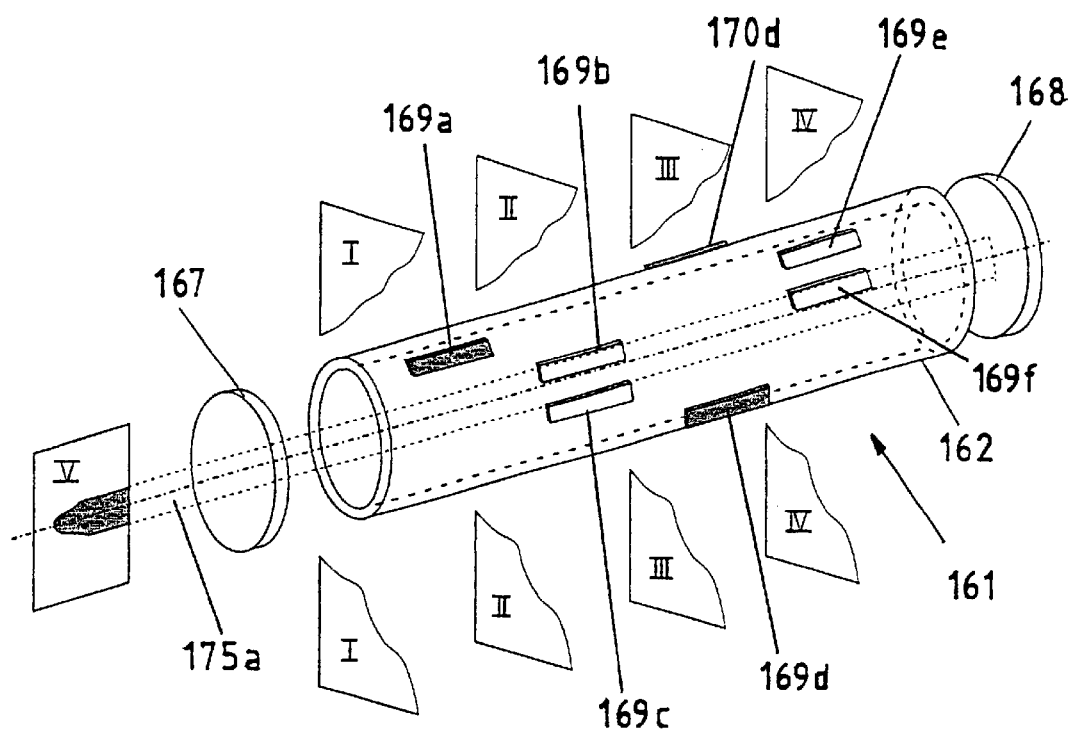
Figure 27:
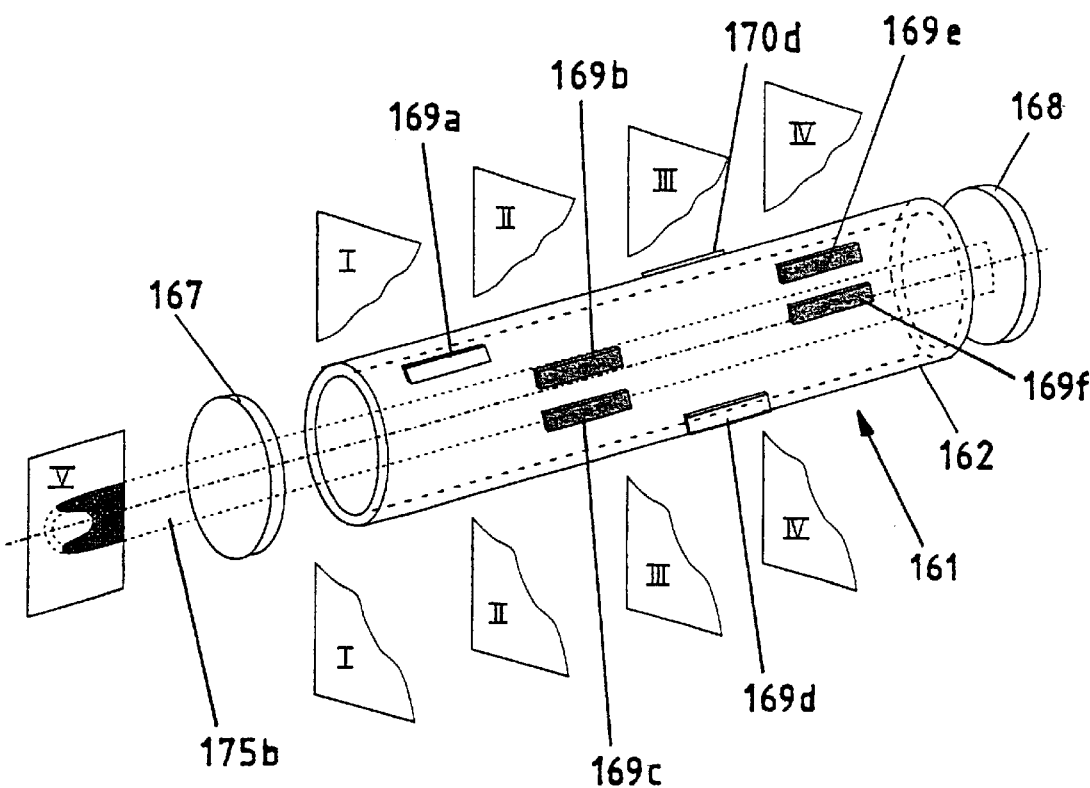

FIG. 1 is a schematic illustration of a first embodiment of a gas laser embodying the present invention;

FIG. 2 is a sectional view along line II—II in FIG. 1;

FIG. 3 is a schematic end view of one of the electrodes in FIGS. 1 and 2:

FIG. 4 is a schematic illustration of a second embodiment of the laser of the present invention;

FIG. 5 is a further schematic representation of the embodiment of FIG. 4; second form of construction of a gas laser with a laser tube;

FIG. 6 is a schematic representation of the discharge areas inside the laser tube according to FIG. 4 as well as the resulting mode;

FIG. 7 discharge areas inside the laser tube according to FIG. 5 as well as the resulting mode;

FIG. 8 is a schematic illustration of a third embodiment of a gas laser;

FIG. 9 is a schematic illustration of a fourth embodiment of the gas laser;

FIG. 10 is a sectional view along line X—X in FIG. 9;

FIG. 11 is a sectional view corresponding to FIG. 10 with the electrodes facing away as compared to FIG. 10;

FIG. 12 is a schematic illustration of a fifth embodiment of the gas laser;

FIG. 13 is a further schematic illustration of the embodiment of FIG. 12;

FIG. 14 illustrates the discharge areas inside the laser tube according to FIG. 12 as well as the resulting mode;

FIG. 15 illustrates the discharge areas inside the laser tube according to FIG. 13 as well as the resulting mode;

FIG. 16 is a schematic illustration of the sixth embodiment of the gas laser;

FIG. 17 is a sectional view along line XVII—XVII in FIG. 16;

FIG. 18 is a schematic illustration of a seventh embodiment of the gas laser;

FIG. 19 is a further schematic illustration of the embodiment of FIG. 18;

FIG. 20 is a representation of discharge areas inside the laser tube according to FIG. 18 as well as the resulting mode;

FIG. 21 is a representation of the discharge areas inside the laser tube according to FIG. 19 as well as the resulting mode;

FIG. 22 is a schematic illustration of an eighth embodiment of a gas laser;

FIG. 23 is a further schematic illustration of the embodiment of FIG. 22;

FIG. 24 is a representation of the discharge areas inside the laser tube according to FIG. 22 as well as the resulting mode;

FIG. 25 is a representation of the discharge areas inside the laser tube according to FIG. 23 as well as the resulting mode;

FIG. 26 is a schematic illustration of a ninth embodiment of a gas laser;

FIG. 27 is a further schematic illustration of the embodiment of FIG. 26;

FIG. 28 illustrates the discharge areas inside the laser tube according to FIG. 26 as well as the resulting mode; and FIG. 29 illustrates the discharge areas inside the laser tube according to FIG. 27 as well as the resulting mode.

DETAILED DESCRIPTION OF THE ILLUSTRATED EMBODIMENT

According to FIG. 1, a laser 1 comprises four laser tubes 2, 3, 4, 5. These serve as housing for a laser gas that contains $CO_2$ or CO in the illustrated example. The laser tubes 2, 3, 4, 5 have a round cross-section and can consist of quartz or a ceramic material such as $Al_2O_3$.

Deflecting mirrors 6 are situated between the laser tubes 2, 3, 4, 5 and deflect a laser beam 15—generated by means of the laser 1 and indicated in FIG. 1 in dot-dash—from the one laser tube into the next laser tube in the direction of propagation of the laser beam 15. An output mirror 7 is situated in front of the laser tube 2; a rear mirror 8 is arranged behind the laser tube 5. The illustrated laser 1 is used—without hereby restricting the invention to specific laser types—for material processing.

An electrode pair consisting of electrodes 9, 10 is arranged on each of the laser tubes 2, 3, 4, 5. In the case of the laser 1, the electrodes 9, 10 extend over almost the entire length of the respective laser tube 2, 3, 4, 5. In addition, the electrodes 9, 10 of each laser tube 2, 3, 4, 5 are rotated 45 degrees around the laser tube axis relative to the electrodes 9, 10 of the adjacent laser tube/s 2, 3, 4, 5. To set the rotation position of the electrode pairs 9, 10 relative to the respective laser tube axis, a setting system can be used.

All electrodes 9, 10 are connected via a switching system 11 with a HF generator 12 or grounded 13. The frequency of the alternating voltage generated by means of the HF generator 12 is between 1 MHz and 10 MHz. A control unit 14 is used to control the switching system 11 as well as the HF generator 12.

By means of the control unit 14, the value of the excitation potential fed into the laser gas via the electrodes 9, 10 on the laser tubes 2, 3, 4, 5 can be influenced. For this purpose, the amplitude of the HF voltage generated by the HF generator can be modified by means of the control unit 14. In addition or as an alternative, the keying frequency and/or the keying ratio of the pulsing excitation of the laser gas can be adjusted by corresponding control of the switching system 11 by means of the control unit 14. The value of the excitation potential fed into the laser gas at the electrodes 9, 10 is likewise dependent upon the set keying frequency or the set keying ratio. The value of the excitation potential fed into the laser gas in turn influences the laser light amplification profile inside the laser tubes 2, 3, 4, 5 and thus the resulting mode. These connections will be described in detail below with regard to FIGS. 4 through 7.

As FIG. 2 shows, the electrodes 9, 10 are designed identically. According to FIG. 3, each of the electrodes 9, 10 has at its side facing the concerned laser tube a recess 16 with a width b and a depth t. The width of the electrodes 9, 10 overall is marked "B" in FIG. 3. The measurements at the electrodes 9, 10 are usefully chosen in such a way that the B:b ratio is greater than 1.5 and the ratio of t:b is greater than 0.2.

A laser 21, as shown in FIGS. 4 and 5 in cutouts, concurs in its method of operation, particularly regarding the type and method of mode modulation, with the laser 1 of FIGS. 1 through 3. In the case of the laser 21, a laser tube 22 serves as the housing for the $CO_2$ laser gas used. Four identical electrode pairs 29, 30 of the design shown in FIGS. 2 and 3 are arranged adjacent to each other along the axis of the laser tube 22 and on the laser tube, and are twisted against each other 45 degrees around the axis of the laser tube 22. Also provided are an output mirror 27 as well as a rear mirror 28. A laser beam 35a, 35b is generated inside the laser tube 22, resulting in a Gauss mode in the operating conditions of the laser 21 according to FIG. 4 and a ring mode in the operating conditions of the laser 21 according to FIG. 5. The difference between the ensuing modes is explained as follows:

According to FIG. 4, the laser 21 is used on the one hand with pulsing excitation and on the other hand in continuous wave or cw operation. The keying frequency and the keying ratio in the case of pulsing excitation of the laser 21 are illustrated with the graph G1. G1 shows the excitation potential fed at the electrodes 29, 30 with pulsing excitation into the laser gas inside the laser tube 22 over the period of time t. Accordingly, the graph G1a shows the time-related progression of the excitation potential fed at the electrodes 29, 30 into the laser gas with continuous wave or cw operation of the laser 21. In both conditions of the laser 21, discharge paths form inside the laser tube 22 in the cross-sections I—I, II—II, III—III and IV—IV which, for their part, can be seen from FIG. 6. The respective discharge paths define the laser light amplification profile in the individual cross-sections of the laser tube 22. The cross-section-related amplification profiles "added up" over the length of the laser tube 22 in turn determine the distribution of the intensity of the laser light over the cross-section of the unfocused laser beam 35a, i.e., the mode of the laser 21 in the operating conditions according to FIG. 4. The resulting mode, namely a Gauss mode, is shown in the partial illustrations V of FIGS. 4 and 6.

Starting from the operating conditions of the laser 21 according to FIG. 4, if the excitation potential fed via the electrodes 29, 30 into the laser gas inside the laser tube 22 is then increased—as illustrated by graphs G2, G3 and G3a of FIG. 5—this results in a mode change. According to G2, the keying ratio has changed in the sense of an increase of the excitation potential fed in, compared to the conditions illustrated by G1 according to FIG. 4. G3 shows an operating condition of the laser 21 with pulsing excitation, in which the amplitude of the HF voltage supplied to the electrodes 29, 30 is increased compared to the operating condition according to G1 of FIG. 4. G3a, like G1a according to FIG. 6, also relates to a case of continuous wave or cw operation of the laser 21. Compared to the conditions shown by G1a, the excitation potential fed into the laser gas in the operating condition of the laser 21 according to G3a is increased. The modified keying frequency according to G2 as well as the increase in the HF voltage amplitude according to G3 and the increase in the supplied excitation potential according to G3a were brought about by means of a control unit 34 of the laser 21 corresponding to the control unit 14 according to FIG. 1. To influence the keying ratio, by means of the control unit 34 a switching system 31 of the laser 21 corresponding to the switching system 11 according to FIG. 1 was controlled appropriately and to change the HF voltage amplitude as well as to increase the supplied excitation potential in continuous wave or cw operation, a HF generator 32 of the laser 21 corresponding to the HF generator 12 according to FIG. 1 was controlled appropriately.

FIG. 7 shows, compared to FIG. 6, how the amplification profiles in the individual cross-section planes of the laser tube 22 developed due to the modification made to the keying ratio/due to the modification of the HF voltage amplitude or the increase in the supplied excitation potential in continuous wave or cw operation. The resulting mode is in turn shown in the partial illustrations V of FIGS. 5 and 7.

Accordingly, each of the above described measures caused the mode of the laser 21 to change from a Gauss mode (FIGS. 4, 6) into a ring mode (FIGS. 5, 7) by increasing the excitation potential fed into the laser gas inside the laser tube 22. With pulsing excitation of the laser 21, the control unit 34 can be used, for example, to change the keying ratio while the keying frequency remains the same. As an alternative, the keying frequency and the keying ratio can also be jointly modified in the case of pulsing excitation.

FIG. 8 shows a laser 41 in the case of which the mode is set by influencing physical properties of the laser gas used. For this purpose, a control unit 54 is connected in controlling manner with a radial bubble 57 for the $CO_2$ laser gas as well as with cooling systems 58 for the laser gas. For reasons of clarity, the connections between the control unit 54 and the radial bubble 57 as well as the cooling systems 58 are indicated in dotted line at the edge of the illustration. An alternating voltage generated by means of a HF generator 52 is supplied pulsating in typical manner at electrodes 49, 50 of the laser 41. A switching system 51 basically makes it possible to adjust the keying frequency and keying ratio. A control of the switching system 51 is possible by means of the control unit 54.

By corresponding control of the radial bubble 57, the pressure and/or flow rate of the laser gas can be set as desired. By controlling the radial bubble 57, it is likewise possible to influence the pressure distribution and/or the flow rate of the laser gas over the cross-section of the housing containing the laser gas. In the case of the latter, in the example shown in FIG. 8 it is also a "folded" laser tube 42 of conventional design. By controlling the cooling system 58, the temperature of the laser gas and/or the temperature distribution of the laser gas over the cross-section of the laser tube 42 can be varied. Depending on the set parameters, different modes ensue. Thus, for example, a ring mode ensues as soon as the temperature and the flow rate of the laser gas take on relatively high values.

A laser 61 is shown in FIG. 9. In this connection, as in the case of the laser 1 according to FIG. 1, laser tubes 62, 63, 64, 65 are arranged one behind the other in the direction of propagation of a laser beam 75 indicated in dot-dash. Between the laser tubes 62, 63, 64, 65, the laser beam 75 is deflected by means of deflection mirrors 66. An output mirror 67 is situated in front of the laser tube 62; a rear mirror 68 is arranged behind the laser tube 65. An electrode pair with electrodes 69, 70 sits on the outside of each of the laser tubes 62, 63, 64, 65. In this connection, the electrode pairs of adjacent laser tubes 62, 63, 64, 65 are twisted against each other 45 degrees around the laser tube axis in each case. The electrodes 69, 70 of the individual electrode pairs are connected via a switching system 71 to a HF generator 72 and are also grounded 73. A control unit 74 is used to control the switching system 71 and thus to control the laser 61. With it, the keying frequency and the keying ratio of the pulsing excitation of the laser 61 can be modified. The frequency of the alternating voltage generated by means of the HF generator 72 is also in the 1 MHz to 100 MHz range.

The laser 61 differs from the laser designs described in the preceding by the type and method of mode setting. Essential parameters for setting the mode in the case of the laser 61 are the keying frequency of the pulsing laser excitation as well as the shape of the surfaces facing each other on the electrodes 69, 70 of the individual electrode pairs arranged on the laser tubes 62, 63, 64, 65.

FIG. 10 shows a first form of construction of the electrodes 69, 70 and FIG. 11 a second form of construction, each on the laser tube 62 of the laser 61.

In both cases, the electrode surfaces facing each other are designed identically. According to FIG. 10, the aforementioned surfaces essentially follow the outer contour of the laser tube 62 at a small distance. In the central area, the surfaces each have two peaks 79 that rest on the laser tube 62. The discharge of the $CO_2$ laser gas inside the laser tube 62 begins igniting from the peaks 79 when the voltage is switched on. Thus, at high keying frequencies, for example at keying frequencies on the order of 100 kHz, an amplification profile accentuated in the middle ensues. If the keying frequency is set at relatively low values, e.g. at values on the order of 1 kHz, a noteworthy discharge also ensues outside of the aforementioned middle area of the electrodes 69, 70.

Since the electrodes 69, 70 of the electrode pairs are twisted against each other at the individual laser tubes 62, 63, 64, 65, the amplification profiles formed in the area of the individual electrodes overlap and a very pronounced Gauss mode results.

The electrodes 69, 70 shown in FIG. 11 have an essentially U-shaped outer contour and are positioned with legs 80 on the associated laser tube, on laser tube 62 in the illustrated case. Consequently, when switching on the voltage the discharge begins to ignite from the peripheral areas of the electrodes 69, 70. At high keying frequencies, e.g. at keying frequencies on the order of 100 kHz, under these circumstances a peripherally accentuated amplification profile results. When the keying frequency is decreased to low values, e.g. to values on the order of 1 kHz, a noteworthy discharge also ensues in the middle area, that is, in the area of the axis of the laser tube 62. As a result of the reciprocal twisting of the electrode pairs at the individual laser tubes 62, 63, 64, 65 relative to each other, the amplification profiles formed in the area of the individual electrode pairs overlap into a more or less pronounced ring mode depending on the selected keying frequency.

A more detailed description of the connections follows below in connection with FIGS. 12 through 15.

A laser 81 illustrated there comprises a laser tube 82, adjacent to which an output mirror 87 as well as a rear mirror 88 are arranged. A total of four electrode pairs each with electrodes 89, 90 rest on the laser tube 82. In principle, the electrodes 89, 90 correspond in design to the electrodes 69, 70 according to FIG. 10. Accordingly, the electrodes 89, 90 are provided at their electrode surfaces facing each other with peaks 99 arranged in the mid-section of these surfaces. Each of the electrodes 89, 90 extends only over a fraction of the length of the laser tube 82. Each of the electrode pairs is rotated 45 degrees around the laser tube axis relative to the electrode pair adjacent to it in the longitudinal direction of the laser tube 82. A laser beam 95*a*, 95*b* is generated inside the laser tube 82.

FIGS. 12 and 14 on the one hand and FIGS. 13 and 15 on the other hand show the conditions at the laser 81 in different operating conditions. The operating conditions of the laser 81 are characterized by the keying frequency and/or the keying ratio set in each case. The keying frequencies or ratios associated with the illustrated operating conditions of the laser 81 are shown in the graphs G4 and G5 of FIGS. 12 through 15.

FIGS. 14 and 15 show in their upper four partial illustrations I—I, II—II, III—III, IV—IV the discharge paths resulting in each case based on the set keying frequencies and keying ratios in the cross-sections I—I through IV—IV of the laser tube 82 according to FIGS. 12 and 13.

As already explained in the preceding, the respective discharge paths determine the amplification profile in the concerned cross-section. The amplification profiles "added up" over the length of the laser tube 82 in turn define the distribution of the intensity of the laser light over the cross-section of the laser beam 95*a*, 95*b* decoupled at the output mirror 87. The mode resulting in each case is shown in the partial illustrations V of FIGS. 12 through 15.

At high keying frequencies (FIGS. 12, 14), the discharge is accentuated in the middle, and at low keying frequencies (FIGS. 13, 15) it is highly accentuated at the periphery. In the latter case, the discharge is determined by the legs— wide compared to the peaks 99—of the electrodes 89, 90. As regards the precise design and the position of the individual discharge paths as well as the resulting distribution of the intensity of the laser light over the cross-section of the laser beam 95*a*, 95*b*, the individual partial illustrations of FIGS. 14 and 15 are expressly referred to. In the operating condition according to FIGS. 12 and 14, the result is accordingly a Gauss mode, and in the operating condition according to FIGS. 13 and 15 it is a ring mode. The setting of the keying frequency and/or the keying ratio at the laser 81 is carried out by means of a switching system and an associated control unit of the kind described in the preceding.

According to FIG. 16, a laser 101 comprises four laser tubes 102, 103, 104, 105 made of quartz, in which there is laser gas that contains $CO_2$ or CO in particular. Between the laser tubes 102, 103, 104, 105 there are deflection mirrors 106 that deflect a generated laser beam 115 from the one laser tube into the next laser tube in the direction of propagation in each case. An output mirror 107 is situated in front of the laser tube 102; a rear mirror 108 is arranged behind the laser tube 105.

Sitting on each of the laser tubes 102, 103, 104, 105 are two different electrode pairs, namely electrodes 109*a*, 110*a*; 109, 110*b*, which extend over almost the entire length of the respective laser tube 102, 103, 104, 105. The electrodes 109*a*, 110*a*; 109*b*, 110*b* of the two electrode pairs on the same laser tube 102, 103, 104, 105 are shifted 90 degrees toward each other. In addition, the electrode pairs 109*a*, 110*a*; 109*b*, 110*b* of a laser tube 102, 103, 104, 105 are rotated 45 degrees around the laser tube axis compared to the corresponding electrode pairs of the adjacent laser tubes 102, 103, 104, 105.

All electrodes 109*a*, 110*a*; 109*b*, 110*b* on the laser tubes 102, 103, 104, 105 are connected via a switching system 111 with a HF generator 112 or are grounded 113. A control unit 114 is used to control the switching system 111.

The control unit 114 can control the switching system 111 in such a way that a voltage is connected at the electrodes 109a, 110a or at the electrodes 109b, 110b or at all electrodes 109a, 110a; 109b, 110b. In addition, in terms of control technology there is the possibility, for example, for the electrodes 109a, 110a to be activated at one of the laser tubes 102, 103, 104, 105, the electrodes 109b, 110b at another of the laser tubes 102, 103, 104, 105 and the electrodes 109a, 110a, 109b, 110b at another of the laser tubes 102, 103, 104, 105. All conceivable combinations of activated electrodes are achievable by means of the control unit 114.

According to FIG. 17, the electrodes 109a, 110a; 109b, 110b of the same electrode pair are designed identically in each case.

The electrodes 109b, 110b have a level surface facing the respective laser tube 102, 103, 104, 105 and are comparably narrow. A discharge path thereby forms as soon as the electrodes 109b, 110b are activated, from the middle of the one electrode to the middle of the opposite electrode 109b, 110b. This results in an amplification profile accentuated in the middle.

The electrodes 109a, 110a have a U-shaped cross-section and are comparably wide, with the legs of the U resting against the respective laser tube 102, 103, 104, 105. As a result, discharge paths at first form from the two legs of the U of the one electrode to the corresponding legs of the U of the other electrodes 109a, 110a. This means that the density of the laser-active particles on the shortest path between the legs of the U of the electrodes 109a, 110a is greater than in the center of the respective laser tube 102, 103, 104, 105.

A more detailed explanation of the connections follows, in connection with FIGS. 18 through 21.

These illustrations show a laser 121 with a laser tube 122, with an output mirror 127 as well as a rear mirror 128 arranged adjacent to them. Sitting on the laser tube 122 in each of four cross-section planes I—I, II—II, III—III, IV—IV are two electrode pairs with electrodes 129a, 130a; 129b, 130b, that correspond in their construction to the electrodes 109a, 110a; 109b, 110b according to FIG. 17. A laser beam 135a, 135b is generated inside the laser tube 122. Each of the electrodes 129a, 130a; 129b, 130b extends only over a fraction of the length of the laser tube 122. The electrode configurations succeeding one another along the laser tube 122 and each comprising two electrode pairs 129a, 130a; 129b, 130b are rotated 45 degrees around the laser tube axis relative to each other. In FIGS. 18 and 19 the activated electrodes, that is, the electrodes to which a HF voltage generated by a related HF generator is fed via a switching system corresponding to the switching system 111 according to FIGS. 16 and 17 are illustrated colored-in in black, and the non-activated electrodes are only illustrated with their outlines. The switching system is controlled in the sense of a switching on or off of the electrodes or of individual electrodes via a control unit of the type already described several times in the preceding.

FIG. 20 shows in the upper four partial illustrations I—I through IV—IV the discharge paths resulting when activating the electrodes 129b, 130b according to FIG. 18 in the cross-sections I—I through IV—IV according to FIG. 18. Accordingly, FIG. 21 shows the design of the discharge paths in the cross-sections I—I through IV—IV according to FIG. 19, with, in the latter case, the electrodes 129a, 130a activated.

The discharge paths determine—as already explained—the amplification profiles in the respective cross-sections. The amplification profiles "added up" over the length of the laser tube 122 in turn define the distribution of the intensity of the laser light over the cross-section of the unfocussed laser beam 135a, 135b decoupled from the output mirror 127. The resulting modes are shown in the partial illustrations V of FIGS. 18 through 21.

As regards the design and the position of the individual discharge paths and regarding the resulting modes, the individual partial illustrations of 20 and 21 are expressly referred to. In the conditions according to FIGS. 18 and 20, this accordingly results in a Gauss mode, and in the conditions according to FIGS. 19 and 20 a ring mode.

FIGS. 22 through 25 show the illustrations corresponding to FIGS. 18 through 21, but for a laser 141 with a laser tube 142 on which four electrode pairs comprising electrodes 149a, 149b, 149c, 149d, 150a, 150b, 150c, 150d are arranged in the same cross-section plane I—I, II—II, III—III, IV—IV. A laser beam 155a, 155b is generated inside the laser tube 142 which contains laser gas with $CO_2$. An output mirror 147 as well as a rear mirror 148 are arranged adjacent to the laser tube 142 as usual.

FIGS. 22 and 24 show the case in which only one electrode pair is activated in each cross-section of the laser tube 142. According to FIGS. 23 and 25, a HF voltage is connected in each case to two electrode pairs with electrodes adjacent to each other. To switch the electrodes on and off in the desired manner, a control unit and a switching system of the preceding kind are used.

As regards the reciprocal assignment of the electrodes 149a, 149b, 149c, 149d, 150a, 150b, 150c, 150d and regarding the design and the position of the discharge paths resulting in each case, and regarding the ensuing modes, the individual partial illustrations of FIGS. 24 and 25 are referred to. According to the partial illustrations V, in the operating condition of the laser 141 according to FIGS. 22 and 24 a Gauss mode results and in the operating condition of the laser 141 according to FIGS. 23 and 25 a ring mode results.

FIGS. 26 through 29 relate to a $CO_2$ laser 161 with a laser tube 162 inside which a laser beam 175a, 175b is generated. As usual, an output mirror 167 as well as a rear mirror 168 are arranged adjacent to the laser tube 162. Electrode pairs with electrodes 169a, 169b, 169c, 169d, 169e, 169f, 170a, 170b, 170c, 170d, 170e, 170f sit on the laser tube 162. The electrode configurations assigned to the individual cross-sections I—I through IV—IV of the laser tube 162 are twisted against each other around the laser tube axis. As an exception to the conditions described in the preceding, in the case of the laser 161, laser tube cross-sections with one electrode pair and laser tube cross-sections with two electrode pairs alternate, when observed in the axial direction of the laser tube 162. In this connection, in the same laser tube cross-section there are either exclusively activated electrodes, i.e., electrodes connected to a HF voltage, or exclusively deactivated electrodes, i.e., electrodes switched off, with switched-off electrode pairs situated between activated electrode pairs in each case in the axial direction of the laser tube 162. The corresponding switching of the electrodes 169a, 169b, 169c, 169d, 169e, 169f, 170a, 170b, 170c, 170d, 170e, 170f is brought about by means of a switching and control arrangement of the type described in the preceding, i.e., by means of a switching system via which the alternating voltage generated by a HF generator can be connected to the aforementioned electrodes, and by means of a control unit controlling the switching system or its switching elements.

The activated electrodes are also filled-in in FIGS. 26 through 29, and the switched-off electrodes are only shown with their outlines. In the example shown, exclusively electrodes of the design marked with the reference numbers 109b, 110b in FIG. 17 are provided.

The discharge paths resulting in the individual laser tube cross-sections due to the respective electrode switching inside the laser tube 162, as well as the reciprocal assignment of the electrodes 169a, 169b, 169c, 169d, 169e, 169f, 170a, 170b, 170c, 170d, 170e, 170f can be seen from illustrations I—I through IV—IV of FIGS. 28 and 29. The partial illustrations V of FIGS. 26 through 29 show the modes of the laser 161 ensuing in each case, namely a Gauss mode in the operating condition according to FIGS. 26 and 28 and a ring mode in the operating condition according to FIGS. 27 and 29.

The invention was described in the preceding without limitations on the general applicability.

Thus, the invention is not limited to lasers with one or more laser tubes with round cross-section; rather, housings or laser tubes with a polygonal cross-section such as a rectangular and, in particular, a square cross-section can also be used. The widest variety of forms of construction are conceivable with respect to arrangement and design of the electrodes as well. For example, the electrodes can be arranged outside or inside the laser tube or they can be a component of the laser tube.

A particularly useful implementation of the invention is in the case of lasers with electrodes spaced relatively far from each other. With such a laser—usually flow-cooled—the amplification profile inside the respective housing or laser tube can be influenced particularly effectively by the measures according to the invention.

Having thus described the invention, what is claimed is:

1. A gas laser in which the distribution of the intensity of the laser light may be modified dynamically without modification of the physical components of the laser comprising:
    (a) a laser tube containing a lasing gas;
    (b) at least two spaced electrodes about said tube for producing excitation of said lasing gas;
    (c) a voltage supply unit to provide the excitation voltage to said electrodes to form a discharge area in said lasing gas in which there is an amplification profile in an excitation cross section; and
    (d) means for adjusting the amplification profile of the laser over the excitation cross section of the laser tube to dynamically and controllably vary the mode of, and intensity distribution in, the cross section of the laser beam generated by said laser.

2. The gas laser according claim 1 wherein said adjusting means modifies the excitation potential produced by said electrodes.

3. The gas laser according claim 1 wherein said adjusting means operates upon said voltage supply to modify the amplitude of the HF voltage fed to said lasing gas by said electrodes.

4. The gas laser according claim 1 wherein said voltage supply unit provides pulsing excitation and said adjusting means is operative to change the keying ratio of the pulsing excitation.

5. The gas laser according claim 1 wherein the excitation potential produced by said electrodes the lasing gas is variable from 0 to at least 8 kW.

6. The gas laser according claim 1 wherein said adjusting means permits setting for the excitation potential produced by said electrodes.

7. The gas laser according claim 6 wherein at least one fixed value for the excitation potential fed into the lasing gas is above 2 kW.

8. The gas laser according claim 1 wherein the mode is continuously adjustable by varying the excitation potential produced in the lasing gas.

9. The gas laser according claim 1 wherein said adjusting means includes at least one device selected from the group comprising:
    (a) a device for adjusting the temperature distribution of the lasing gas over the cross section of said laser tube for the lasing gas;
    (b) a device for adjusting the temperature of the lasing gas in said laser tube;
    (c) a device for adjusting the pressure distribution of the lasing gas over the cross section of said laser tube for the laser gas;
    (d) a device for adjusting the pressure of the lasing gas in said laser tube;
    (e) a device for adjusting the flow rate distribution of the lasing gas over the cross section of said laser tube for the lasing gas; and
    (f) a device for adjusting the flow rate of the lasing gas in said laser tube.

10. The gas laser according claim 1 wherein said spaced electrodes have surfaces which are configured so that the selection of different keying frequencies will produce different shapes for the discharge channels and thereby different modes in the lasing gas.

11. The gas laser according claim 10 wherein the keying frequency is variable from 0 to more than 100 kHz.

12. The gas laser according claim 10 wherein said adjusting means allows setting of several predetermined keying frequencies.

13. The gas laser according claim 12 wherein at least one keying frequency is greater than 10 kHz.

14. The gas laser according claim 12 wherein at least one keying frequency is greater than 50 kHz.

15. The gas laser according claim 10 wherein said keying ratio is variable.

16. The gas laser according claim 10 wherein the mode is continuously adjustable by varying the keying frequency and/or the keying ratio.

17. The gas laser according claim 1 wherein more than two electrodes are provided.

18. The gas laser according claim 1 wherein the configuration of the electrode surfaces facing said laser tube substantially conforms to the configuration of the surface of said laser tube.

19. The gas laser according claim 1 wherein the surface of said electrodes has a configuration selected from the group consisting at least one raised area such as a point or edge, and at least one recess such as a groove.

20. The gas laser according claim 19 wherein said raised area or recess is provided in the central area of said electrode surface.

21. The gas laser according claim 20 wherein the ratio of the width (B) of the electrode to the width (b) of the recess is greater than 1.5.

22. The gas laser according claim 20 wherein the ratio of the depth (t) of the recess to the width (b) of the recess is greater than 0.2.

23. The gas laser according claim 19 wherein the raised area is formed by a ridge formation on the electrode surface.

24. The gas laser according claim 19 wherein at least one portion of the electrodes has several differently designed surface areas facing said laser tube.

25. The gas laser according claim 1 wherein there are more than two electrodes, and said adjusting means include switching elements operatively connected to at least one of said electrodes and said voltage supply unit and a control unit controls said switching elements to select a specific amplification profile for the laser beam.

26. The gas laser according claim 25 wherein said switching elements are on/off switches.

27. The gas laser according claim 1 wherein said laser tube and electrodes are disposed within a housing.

28. The gas laser according claim 27 wherein there are also included in said housing beam guiding elements, such as deflection mirrors which determine the path of the laser beam in said housing.

29. The gas laser according claim 25 wherein there are arranged in a cross sectional plane of said housing more than two electrodes each insulated from other electrodes and able to be connected independently of each other with said voltage supply unit by means of said switching elements.

30. The gas laser according claim 1 wherein said voltage supply unit feeds an alternating voltage to said electrodes.

31. The gas laser according claim 30 wherein the frequency of the supplied alternating voltage is greater than 100 kHz.

32. The gas laser according claim 30 wherein the frequency of the supplied alternating voltage is between 1 MHz and 100 MHz.

33. The gas laser according claim 1 wherein said electrodes are disposed in a manner selected from the group consisting of:

(a) offset circumferentially of said laser tube;

(b) differently bent;

(c) have a different azimuthal span; and (d) have differently design surfaces facing said laser tube.

34. The gas laser according claim 1 wherein the design of the surfaces facing said laser tube of cooperating pairs of electrodes is the same.

35. The gas laser according claim 1 wherein multiple electrodes are axially spaced along the axial length of said laser tube.

36. The gas laser according claim 1 wherein said electrodes are at least partially at a different distance from the axis of the laser beam.

* * * * *